(12) United States Patent
Garber

(10) Patent No.: US 6,210,577 B1
(45) Date of Patent: *Apr. 3, 2001

(54) MULTIPLE CARTRIDGE HOUSING ASSEMBLY FOR THE HIGH PURITY FILTRATION OF LIQUIDS

(76) Inventor: Robert Guy Garber, 961 S. Daniel Way, San Jose, CA (US) 94128

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,063

(22) Filed: Apr. 29, 1997

(51) Int. Cl.[7] .............................. B01D 35/01; B01D 35/30
(52) U.S. Cl. ..................... 210/335; 210/349; 210/436; 210/450; 210/455
(58) Field of Search ..................... 210/252, 300, 210/314, 316, 322, 323.1, 335, 337–339, 344, 349, 436, 450, 452, 454, 455, 900; 55/350.1, 344

(56) References Cited

U.S. PATENT DOCUMENTS 3,870,636 * 3/1975 Schettler .............................. 210/335
5,089,131 * 2/1992 Gentry .................................. 210/335
5,158,585 * 10/1992 Saho et al. ........................... 55/350.1
5,609,757 * 3/1997 Schiavo et al. ...................... 210/450

* cited by examiner

Primary Examiner—Matthew O. Savage

(57) ABSTRACT

A multiple cartridge filter housing assembly for the high purity filtration of etching liquids, deionized water, slurries and other liquids used in the semiconductor, pharmaceutical and chemical industries. It comprises at least one upper and one lower cartridge within a bottom housing, a top housing and at least one extension housing. A vent tube in the top housing extending to the upper spacer ring in the extension housing generates a first air pocket between its lower end and the top of the housing assembly. The upper end of each cartridge is centered by a flow-through spacer ring. The lower end of each cartridge is sealed, against the pressure drop across the cartridge, and centered by an adapter ring. The adapter rings, except for the bottom one, have a downwardly extending tube with flow-through holes at its lower end such that secondary air pockets are generated above the holes and below the bottom surface of the adapter ring. The first and the second air pockets are in series allowing for multi-dampening of pressure variations in the liquid within and exiting the housing assembly. Nut rings with tension rings at each interface between housing components provide reliable seals inspite of temperature cycling.

16 Claims, 22 Drawing Sheets

MULTIPLE CARTRIDGE HOUSING ASSEMBLY FOR THE HIGH PURITY FILTRATION OF LIQUIDS

BACKGROUND

1. Field of the Invention

The present invention generally relates to the filtering of liquids and more specifically to the high-purity filtration of high temperature etching liquids, primarely used in the processing of semiconductor devices and requiring very high reliability at an extremely low particle count, and to the filtration of liquids in the pharmaceutical and chemical industries.

2. Description of the Prior Art

Presently available filter housing assemblies use cartridges inserted into a cylindrical housing with a twist-screwtop to tighten an O-Ring against the housing flange for generating a sealed unit with an inlet and an outlet for the liquid to be filtered. The liquid enters under pressure through the inlet into the space between the housing and the cylindrical filter cartridge and is forced radially inward through the filter. The filter surrounds a concentric cylindrical space through which the filtered liquid exits from the outlet at the bottom of the filter housing. The filter cartridge is closed off at its top and has a nose at its bottom, surrounded by O-rings, by which the cartridge is held in the bottom recess of the filter housing. Potential shortcomings of the filter housing are damage to the O-ring because of twisting, deforming and abrasive action during screw-on closure, which can contribute to leakage and a decrease in filtration efficiency. Usually the cartridge is inserted and held only at the housing bottom by two parallel O-rings around the cartridge nose. The filter cartridge may tilt as a consequence of fluid pressure action and no longer be concentric with the filter housing, causing an uneven flow through the cartridge. This action also may contribute to lower filtration efficiency and a higher particle count by uneven filtration or by bypassing of the filter as well as to lower filter cartidge life. Together with the used cartridge filter housings are often thrown away, amounting to economical and environmental waste. Where ultrapure filtration is needed, several filters, possibly with decreasing particle size, may be used, requiring several filter housings in sequence at an increased cost. Molded orifices at the top portion of the housing have been used to relieve over-pressure or for back-flushing.

SUMMARY OF THE INVENTION

It is therefore an object of the present invention to provide a housing assembly design for at least two filters in series, made out of a suitable plastic like "TEFLON"®, for the prevention of leaks, even at temperatures in the range of 190 degrees Celsius (375 degrees F) and at pressures as high as 5 bars (70 psi), for even flow characteristics throughout the life of the filter cartridge and for creating an extremely low particle count. The filter housing can hold several cartridges in sequence, directing the liquid to be filtered through proessively finer filters, which are usually also progressively more expensive. The coarse, cheaper filter clogs up faster and will have to be changed more often, while the finest filter would have the longest operating life. Often it is more economical to replace the cartridges together to minimize downtime. A filter cartridge change in the equipment described is easily done by removing only the top housing without disconnecting inlet and outlet pipes, minimizing equipment downtime.

Briefly, a preferred embodiment of the present invention includes a bottom housing, a tube-shaped extension housing, for holding at least one cartridge, and a top housing. The respective lower and upper ends of the interfaces between housings have a similar structure. The upper ends have a lip around the opening carrying an outside thread for receiving the inside thread of a nut ring pushing against a flange around the lower ends of matching lower inter-face ends for fastening. The lower and upper ends of these cartridges are held concentric by adapter rings and flow-through spacer rings. An adapter ring centers the nose of an upper cartridge and directs the liquid flow from the nose of an upper cartridge to the cylindrical outer surface of a lower cartridge for an inwardly radial flow across the filter and downward through the nose while sealing against the pressure drop across the cartridge. An upper and a lower cartridge can be joined for easy insertion and removal through the top of the housing without requiring the disassembly of the inlet and outlet pipes. The top housing also contains an opening in its top for the insertion of a vent tube with a very small cross-section, which enforces a certain liquid level in the housing to generate an air space on top of the upper cartridge. This air pocket, the lower end of which is defined by the lower end of the vent tube, serves as a damper for pressure variations generated by the pump feeding the filter housing assembly. The cross-section of the vent is very small compared to the filter area resulting in a very small leakage volume which is fed back to the intake of the pump feeding the filter. The adapter ring is a crucial element in connecting several cartridges in series for easy insertion and removal in order to minimize downtime during operations. From its recess it carries a downward tube carrying flow-through holes at its lower end such that above these holes and below the adapter ring air pockets can be sustained which are in series with the air pocket at the top of the housing assembly, thus providing a multi-dampening effect on pressure variations due to pump action.

An advantage of the present invention is that the interfaces are joined by a sliding action, avoiding a twisting and abrasive action on the O-Rings that provide a seal between the housings.

Another advantage of the present invention is the provision of a quadruple seal between housings by using semi-circular grooves in opposing surfaces between housings for the accommodation of sealing O-rings.

Another advantage of the present invention is the provision of a circular spacer around the top of the filter cartridge asserting its concentric positioning, thus providing an even liquid flow through the filter and preventing tilting of a cartridge and damage to the cartridge nose O-rings.

Another advantage of the present invention is the easy and fast insertion and removal of cartridges through the top of the housing without disconnecting inlet and outlet pipes thus minimizing equipment downtime.

Another advantage of the present invention is the formation of an air space above the level of the liquid, defined by the lower end of a vent tube through the cap for the dampening of pressure variations generated by the pump feeding the filter and for maintenance of a minimum liquid level around the filter cartridge, thus contributing to an efficient filtration and a low particle count.

Another advantage of the present invention is the easy adaptation of the housing for the use of as many filter cartridges as needed and the easy change of cartridges.

Another advantage of the present invention is the easy adaptation of a modified version of a multi-cartridge assembly to a one-piece molded assembly for easy insertion and removal for minimizing downtime during operations.

IN THE DRAWINGS

DETAILED DESCRIPTION OF THE PREFERRED EMBODIMENTS

A multiple cartridge filter housing assembly for the high purity filtration of etching liquids, deionized water, slurries and other liquids used in the semiconductor, pharmaceutical and chemical industries is described below. The cylindrically shaped housing assembly according to the present invention allows to use several filter cartridges in series, like a sequence of a 2 micron filter, a 1 micron filter followed by a 0.5 micron filter, which are usually progressively more expensive. The largest, least expensive filter gets clogged up first and has to be replaced more often but facilitates a much less frequent change of the smallest, most expensive filter, thus contributing to the economics and the reliability of the overall filtering process. An opposing argument is that all filters in a housing should be changed at the same time in order to minimize expensive downtime during operations. The filter can be implemented as housing assembly 10, made out of a plastic, like Polytetraflouroethylene (PTFE or TEFLON®) for higher temperatures or Polypropylene for moderate temperatures, described in the following and depicted in the Figures for at least two serially connected filter cartridges. In the following description and in the claims "cup" is used for a cup-shaped cavity covering one half or more of a cartridge, and "cap" is used for a cup-shaped cavity with less than one half or no coverage of a filter cartridge.

Figure 1:
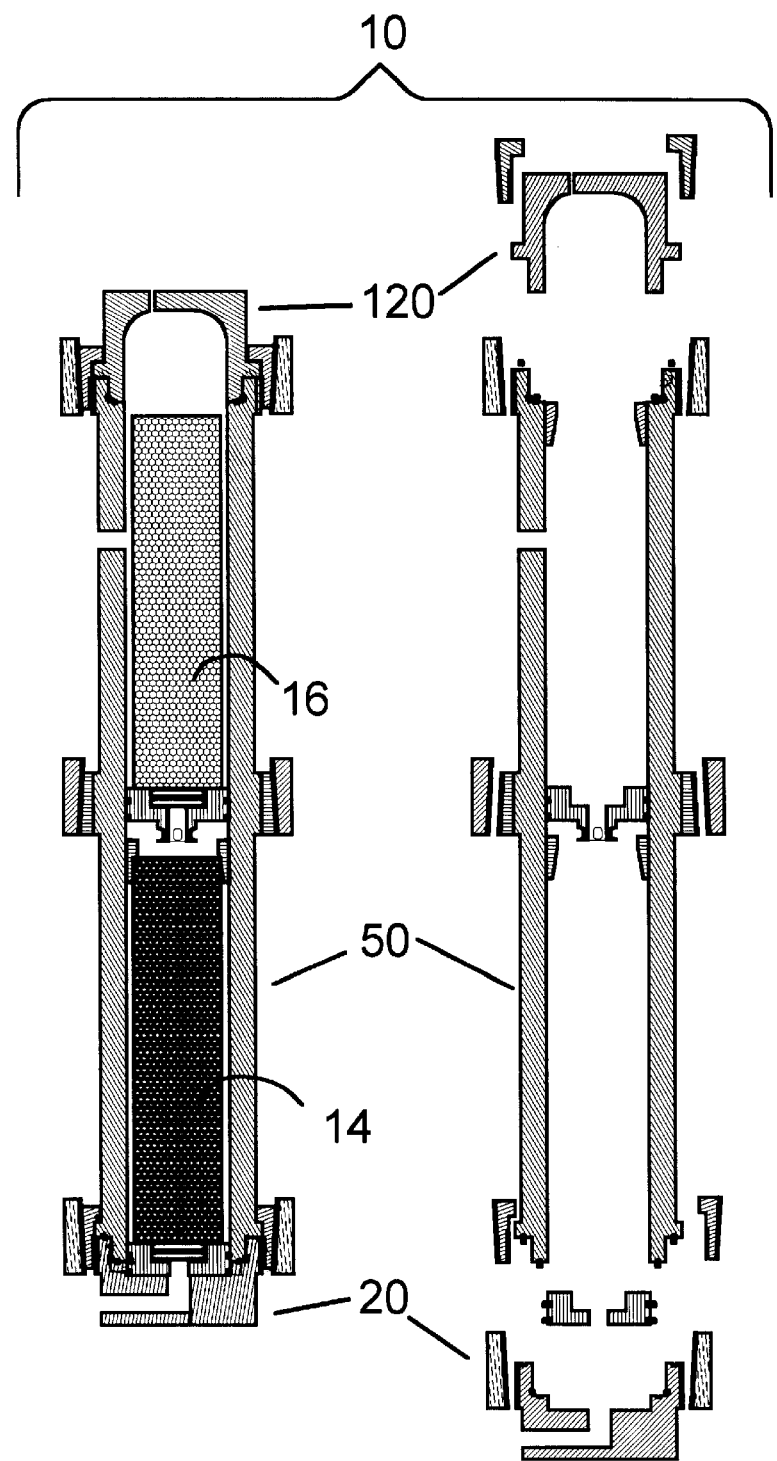
FIG. 1 is a cross-section overview of version A of a housing assembly.
Figure 2:
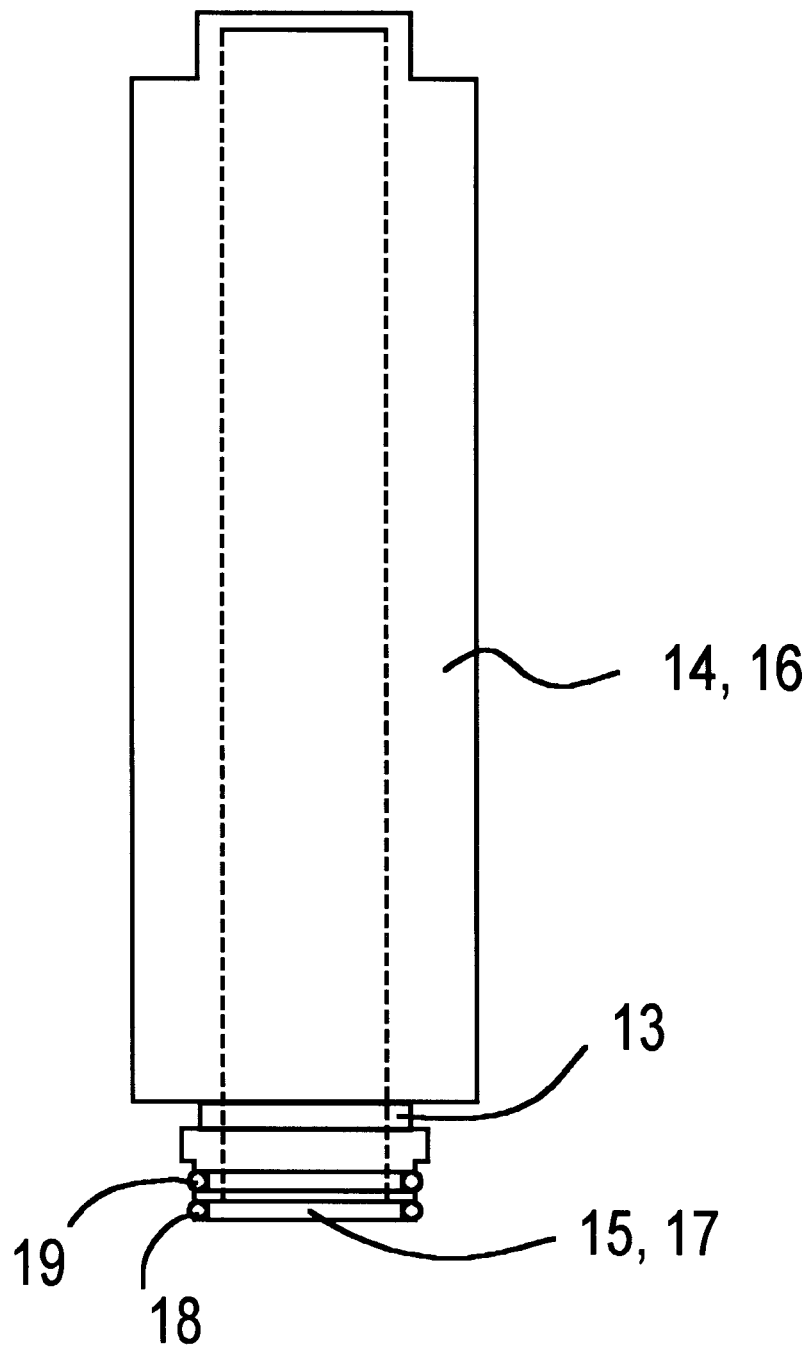
FIG. 2 is a cross-section of a prior-art commercial filter cartridge.

A housing assembly 10 as seen in FIG. 1, comprises a bottom housing 20, an extension housing 50, a top housing 120, at least two standardized cartridges 14 and 16, and means for holding the housing assembly together, sealing it and for centering the cartridges within, as described below. A commercially available cylindrical filter cartridge 14 as depicted in FIG. 2, is closed at the top and encompasses a tube-shaped filter, through which the liquid is forced under pressure in an inwardly radial direction into its concentric cavity with a nose 15 at its lower end, through which the filtered liquid exits. Nose 15, separated from the cartridge by a neck 13, customarily has two parallel O-rings 18 and 19 concentrically attached around its cylindrical face for a sealed seating within its respective receptacle. The analog holds true for a cartridge 16 with a nose 17.

The embodiments can be described in three varieties: version A (FIG. 1) with cap-shaped bottom and top housings and in between one longer tube-shaped extension housing for multiple cartridges, version B (FIG. 19) with a cup-shaped bottom and top housings and in between several tube-shaped extension housings, each holding one cartridge, and version C (FIG. 20) with only cup-shaped bottom and top housings, each holding one cartridge. All housing components and their recesses, stubs and flanges are rotationally symmetrical, that is concentric and cylindrical, unless otherwise mentioned.

Figure 3:
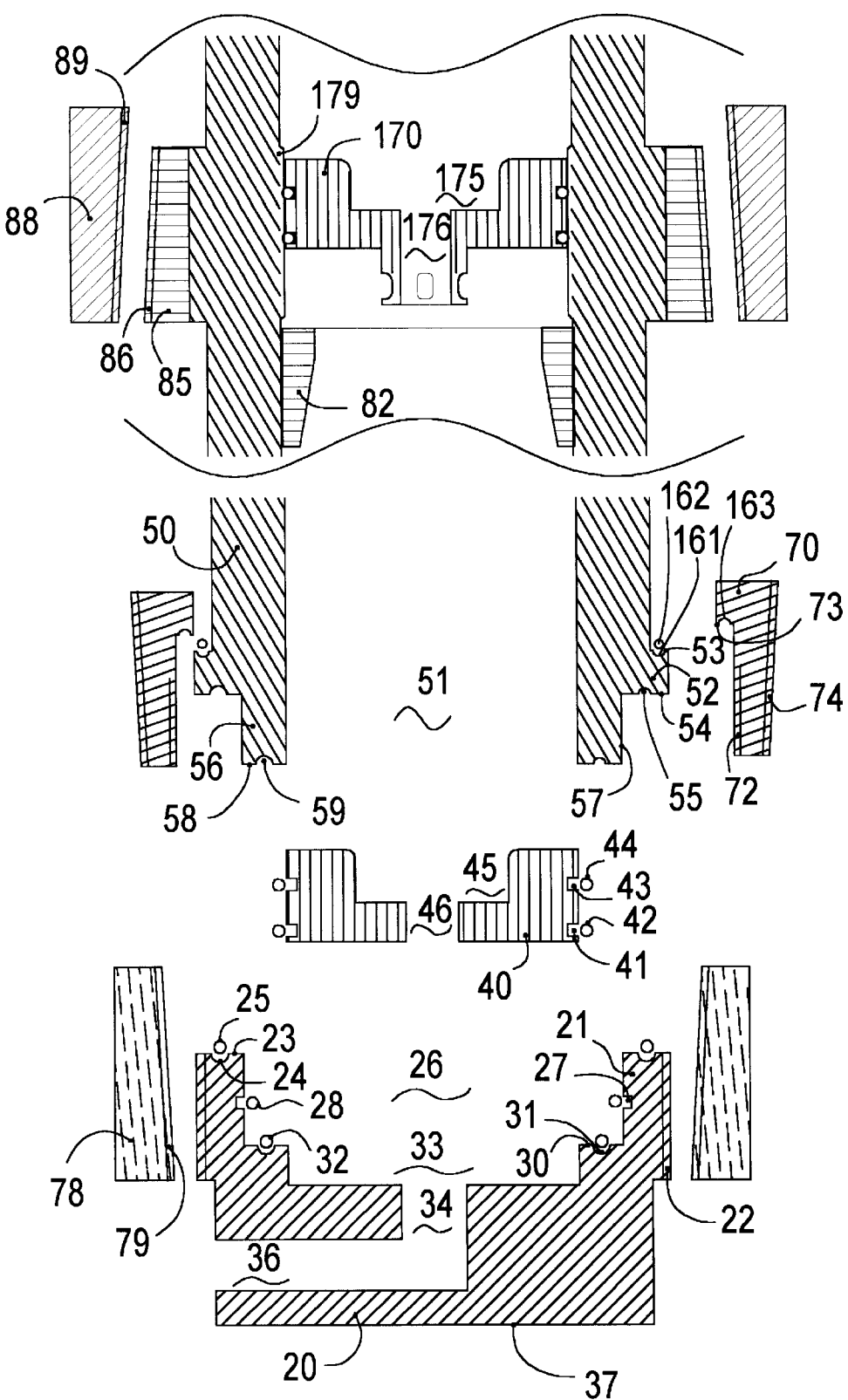
FIG. 3 is a cross-section view of the version A bottom housing—extension housing first interface including a juncture between cartridges.

FIG. 3 is a cross-section view of a version A bottom housing—extension housing first interface for a two cartridge housing assembly. Cap-shaped bottom housing 20 has around its mouth a lip 21, carrying an outer thread 22, with an annular surface 23 having a first lip groove 24 for a first O-ring 25. At its mouth housing 20 also has a larger radius recess 26 which has a first cylinder groove 27 for a second O-ring 28 in its cylindrical part, and which also has a flat annular bottom surface 30 with a first recess groove 31 for a third O-ring 32. Recess 26 has a deeper smaller radius recess 33 with an opening 34 for the filtered liquid to flow downwardly towards outlet 36, which is a radially oriented boring for receiving a pipe with a tapered thread. A flat surface 37 at the bottom of housing 20 allows housing assembly 10 to stand on.

A cylindrical first adapter ring 40 has a lower groove 41 and an upper groove 43, for holding a seventh O-ring 42 and an eighth O-ring 44, respectively, on its outside cylindrical surface, which fits into recess 33 of housing 20. At its center ring 40 has a recess 45 with an opening 46 for concentrically receiving nose 15 of lower cartridge 14 which, when seated in the cylindrical portion of recess 45 of ring 40, forms a dual seal of compressed O-rings 18 and 19 of cartridge 14 against the cylindrical portion of recess 45 in ring 40. This seal and the one between ring 40 and housings 20 and 50 by virtue of O-rings 42 and 44 separate the in-flowing liquid from the outflowing liquid and seals against the corresponding pressure drop across cartridge 14, thus serving one of the two purposes of adapter ring 40. The other purpose is to center the nose 15 of cartridge 14.

A tube-shaped extension housing 50 covers a cavity 51 for lower cartridge 14 and upper cartridge 16 and carries at its lower end a first radial flange 52 with an annular upper surface 53, carrying a groove 161 for an O-ring 162, and an annular lower surface 54 with a first flange groove 55 for accommodating first O-ring 25. The lower end of housing 50 also carries a smaller radius axial stub 56 with an outer cylindrical surface 57 and an annular surface 58 carrying a first stub groove 59 for accomodating third O-ring 32. Surface 57 seals radially against O-ring 28 when stub 56 is slidingly inserted into recess 26 of housing 20. A first nut ring 70 holds housing 50 and housing 20 together, having a cylindrical inside thread 72, an annular recess surface 73 with a groove 163 for receiving O-ring 162, and a tapered outer thread 74. When inner thread 72 engages outer thread 22 of housing 20, recess surface 73 presses on flange surface 53 via O-ring 162 for a tight seal by pushing surfaces 54 and 58 of housing 50 against surfaces 23 and 30 of housing 20, respectively. Under these circumstances radial seals are formed by O-ring 42 of ring 40 pressing against the cylindrical surface of recess 33 of housing 20, by O-ring 44 of ring 40 pressing against the inner surface of cavity 51 of housing 50 and by O-ring 28 of housing 20 pressing against the cylindrical surface 57 of stub 56. An axial seal is formed by O-ring 25 being pushed against groove 24 of surface 23 of housing 20 and against groove 55 of surface 54 of housing 50. A second axial seal pushes O-ring 32 against groove 31 in housing 20 and against groove 59 in stub surface 58 of housing 50. A tension ring 78 carries a tapered inner thread 79 which engages tapered thread 74 of nut ring 70 to compress and tighten thread 72 of nut ring 70 against thread 22 of housing 20. This completes the first interface housing 20 to housing 50.

Figure 5:
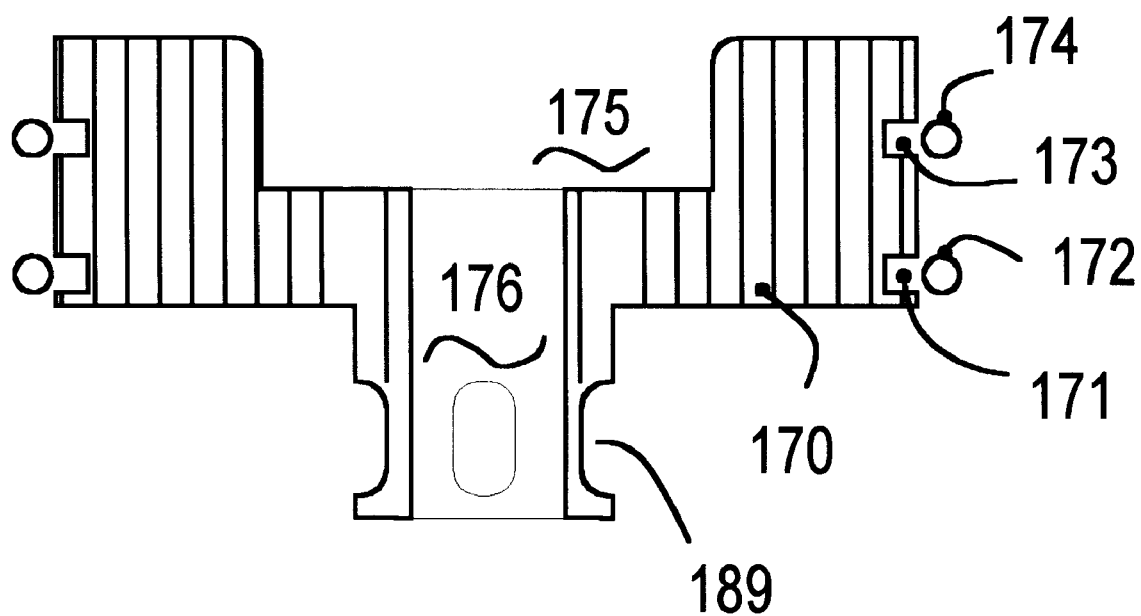
FIG. 5 is a cross-section view of a version A second adapter ring.
Figure 18:
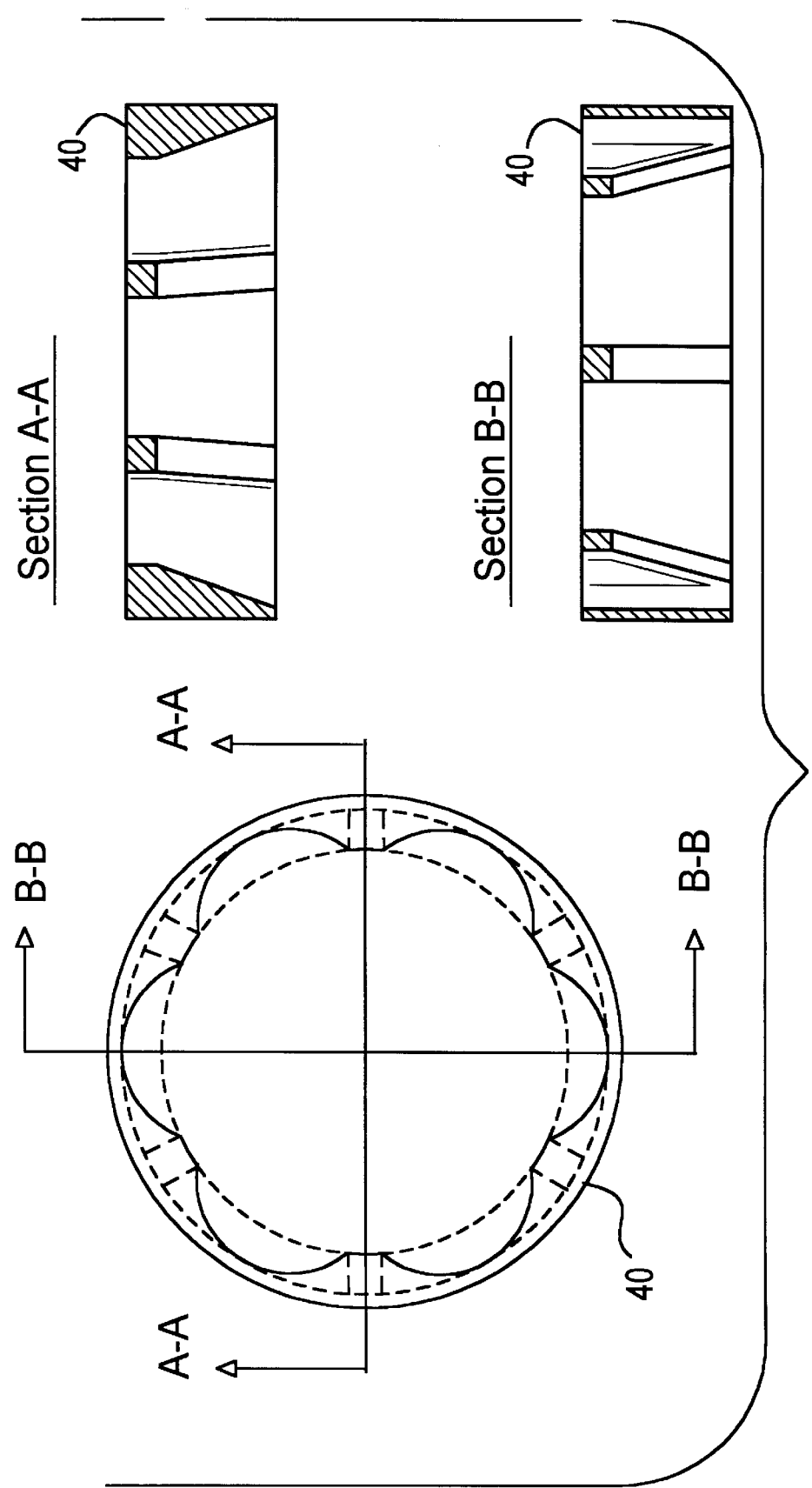
FIG. 18 is a cross-section of a spacer ring.
Figure 21:
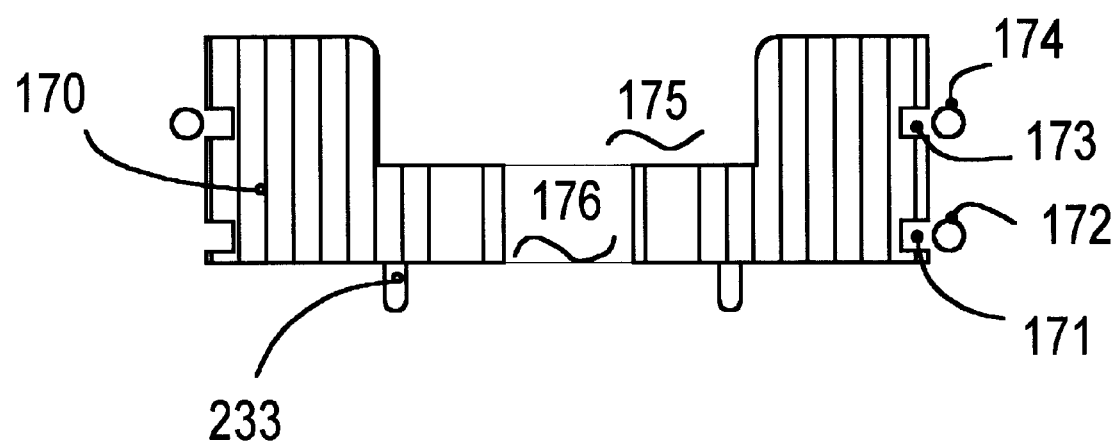
FIG. 21 is a view of an adapter ring with axial spacers.
Figure 22:
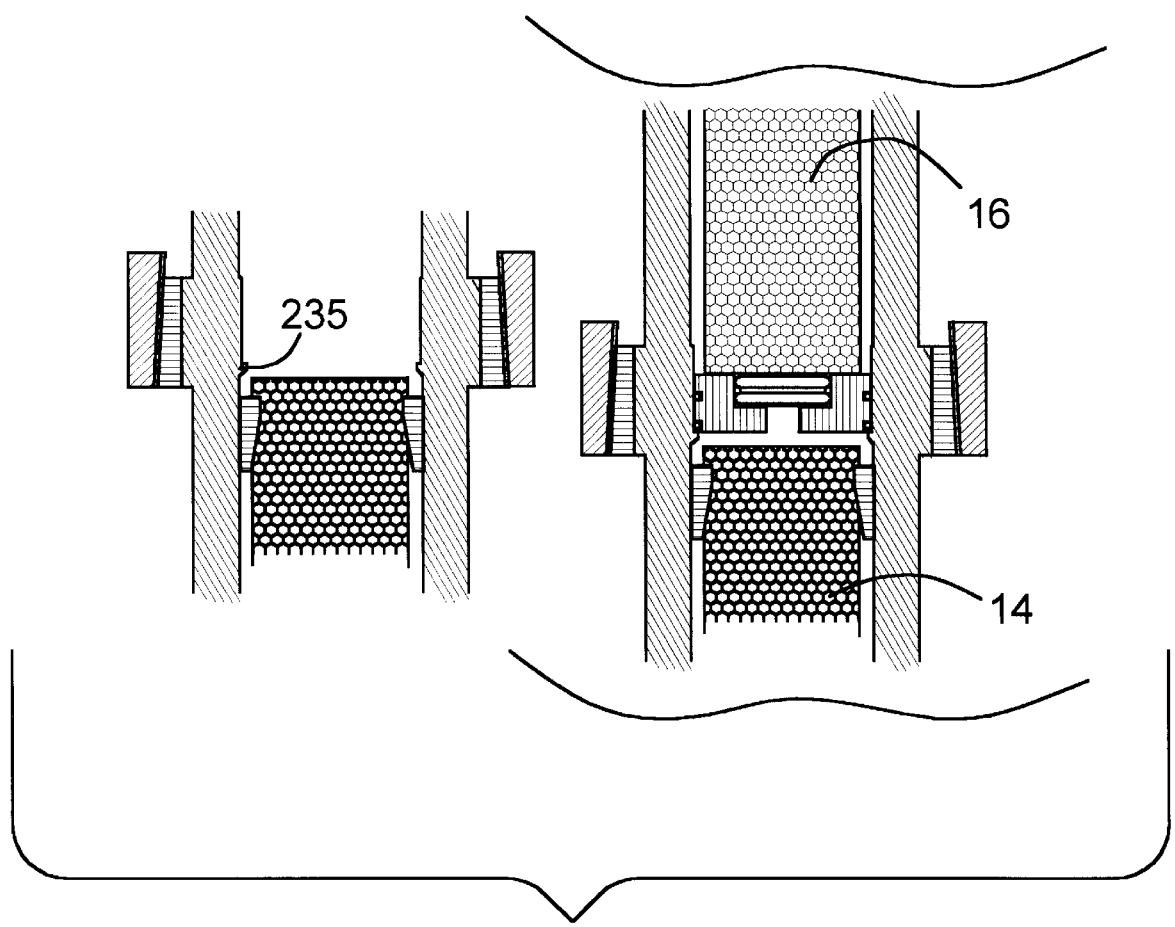
FIG. 22 is a view of a housing cavity with a recess for an adapter ring.

Extension housing 50 also carries a spacer ring 82 and an adapter ring 170 to separate lower cartridge 14 from upper cartridge 16. Spacer ring 82, as illustrated in FIG. 18, has a flared cross-section with its inner and outer radii being equal to the radius of cartridges 14, 16 and to the radius of cavity 51, respectively. It serves as a flow-through spacer for centering the upper end of cartridge 14. It carries several channels for the liquid in the form of slanted hollow segements around its circumference, the apexes of which touch cartridge 14. As depicted in FIG. 5, adapter ring 170 is essentially identical to adapter ring 40, with grooves 171 and 173 on its outside cylindrical surface for O-rings 172 and 174, respectively, and a recess 175 which receives nose 17 of upper cartridge 16 for a sealed concentric fit. Recess 175 has a concentric downward tube 176 with lateral openings 189 at its lower end. The combination of rings 170 and 82 directs the flow of the liquid from nose 17 of upper cartridge 16 via adapter ring 170 through tube 176, its openings 189 and flow-through ring 82 to the circumference of lower cartridge 14. Upon filling of housing assembly 10 with liquid, air will be trapped around tube 176 above openings 189 providing an air pocket at a juncture of cartridges 14 and 16 and on top of spacer ring 82, which helps to dampen pressure variations. The inside of cavity 51 of housing 50 has a radius slightly larger than that of adapter ring 170 exept for a decreased radius zone 179 (refer to FIG. 22) at its end position at the juncture between upper and lower cartridge 14, 16 to facilitate easy insertion and removal of cartridges while preserving a tight fit at the end position of adapter ring 170. A modification of adapter ring 170, as seen in FIG. 21, has a tube 176 level with the bottom surface of the adapter ring, carrying downwardly extending axial spacers 233. Another modification is depicted in FIG. 22 where an adapter ring 170 similar to adapter ring 40 is inserted into recess 235 within the decreased radius zone 179 within cavity 51, thus maintaining a space between the bottom of the adapter ring and the top of the lower cartridge 14. Both of these modifications using a spacer ring 82 centering the top of cartridge 14 allow liquid flow to its circumference from the end of tube 176.

As seen in FIG. 3, in order to counteract bulging of housing 50 due to high pressure and high temperature a split ring 85 having a tapered thread 86 is placed on the outside of housing 50 across from the combination ring 170 and ring 82 to prevent leakage. Ring 85 is tightened by turning a tension ring 88, which is identical to ring 78, with a tapered thread 89, thus engaging thread 86.

Figure 4:
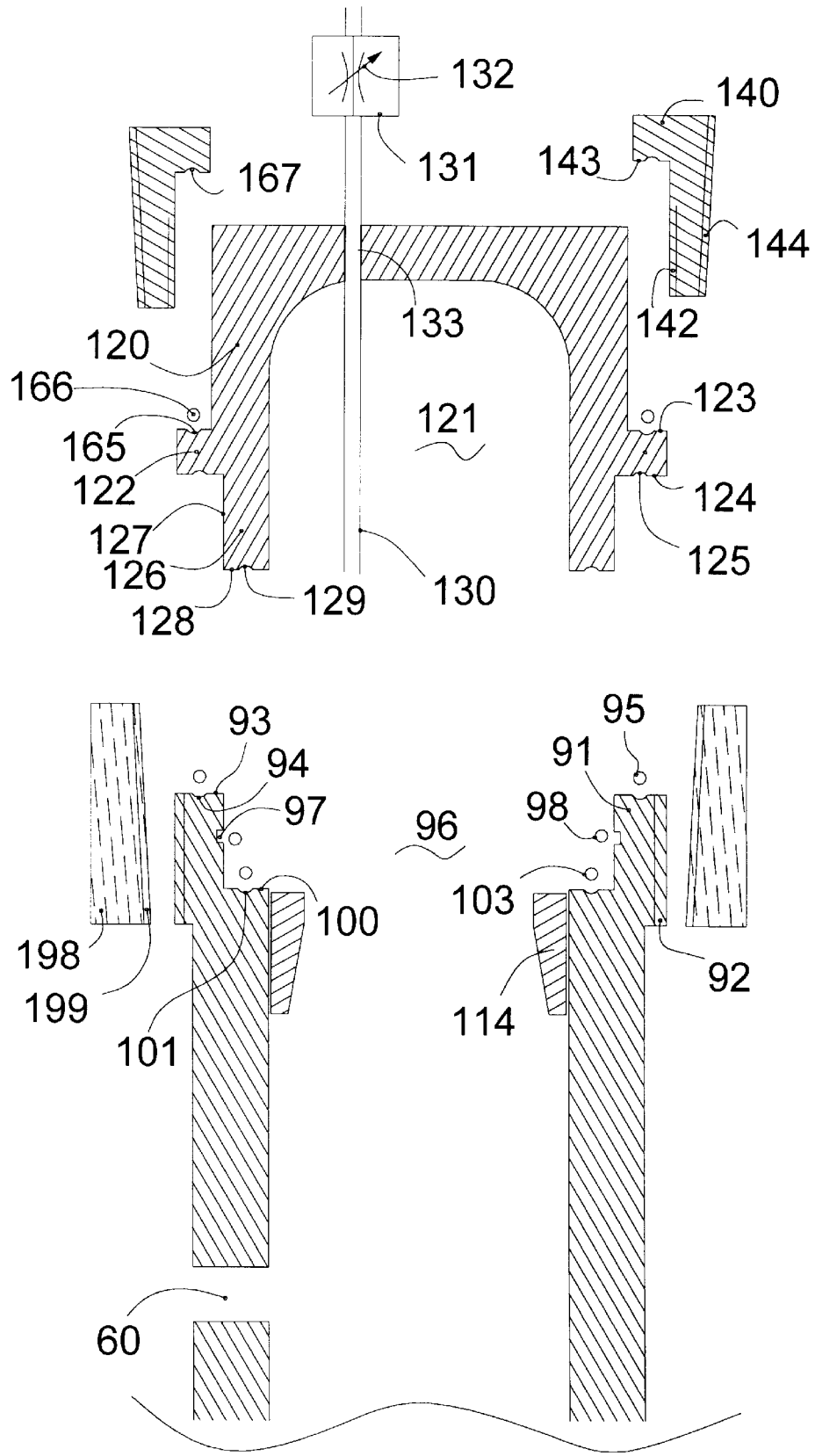
FIG. 4 is a cross-section view of the version A extension housing—top housing second interface including a vent tube.

As illustrated in FIG. 4, at its upper end housing 50 has an inlet 60, which is a radially oriented boring for receiving a pipe with a tapered thread, and which directs the liquid towards the cylindrical surface of cartridge 16. The top housing 120 forms a closed sealed cavity with extension housing 50 and bottom housing 20. The second interface housing 50 to housing 120 is essentially identical to the first interface housing 20 to housing 50 above the level of surface 30, with corresponding element numbers having a value of 70 added. The upper end of housing 50 has around its upper end a lip 91, carrying outside thread 92, with an annular surface 93 having a second lip groove 94 for a fourth O-ring 95. Lip 91 surrounds a larger radius recess 96 which has a second recess groove 97 for a fifth O-ring 98 in its cylindrical part, and which also has a flat annular bottom surface 100 with a second recess groove 101 for a sixth O-ring 103. A spacer ring 114, identical to spacer ring 82, is inserted into the upper end of housing 50 to hold the upper end of cartridge 16 concentric. Top housing 120 carries a second flange 122 with an annular upper surface 123, carrying a groove 165 for an O-ring 166, and an annular lower surface 124 with a second flange groove 125 for accommodating the fourth O-ring 95. At its lower end housing 120 carries a smaller radius axial stub 126 with an outer cylindrical surface 127 and an annular surface 128 carrying a second stub groove 129 for accepting the sixth O-ring 103. Surface 127 seals radially against O-ring 98 when stub 126 is slidingly inserted into recess 96 of housing 50. A nut ring 140 holds housing 120 and housing 50 together, and has a cylindrical inside thread 142, an annular recess surface 143 with a groove 167 for receiving O-ring 166, and has a tapered outer thread 144. When inner thread 142 engages outer thread 92 of housing 50, recess surface 143 presses on flange surface 123 via O-ring 166 for a tight seal by pushing surfaces 124 and 128 of housing 120 against surfaces 93 and 100 of housing 50, respectively. Under these circumstances a radial seal is formed by O-ring 98 of housing 50 pressing against the cylindrical surface 127 of stub 126. An axial seal is formed by O-ring 95 being pushed against groove 94 of surface 93 of housing 50 and against groove 125 of flange surface 124 of housing 120. A second axial seal is formed by pushing O-ring 103 against groove 101 in housing 50 and against groove 129 in surface 128 of housing 120. A tension ring 198 carries a tapered inner thread 199 which engages tapered outer thread 144 of ring 140 to tighten thread 142 of nut ring 140 against thread 92 of housing 50. This completes the second interface housing 50 to housing 120. O-rings 162 and 166 are more elastic than the other axial O-rings which usually get compressed too much when nut rings are excessively tightened towards mating flanges without consideration for temperature cycling due to shut-downs for weekends, holidays, repairs etc. Under these circumstances these other axial O-rings then compress and deepen respective grooves in the plastic material of housings at elevated temperatures, thus contributing to a potential leakage problem. The higher elasticity of O-rings 162 and 166 helps to adjust and lessen this extra axial pressure while providing an adjustable leakproof connection inspite of cycling at elevated temperatures. Since both groove surfaces touching O-rings 162 and 166 are made out of a low friction plastic, like TEFLON® or Polypro-pylene, twisting and abrasion of these O-rings are kept to a minimum.

Figure 6:
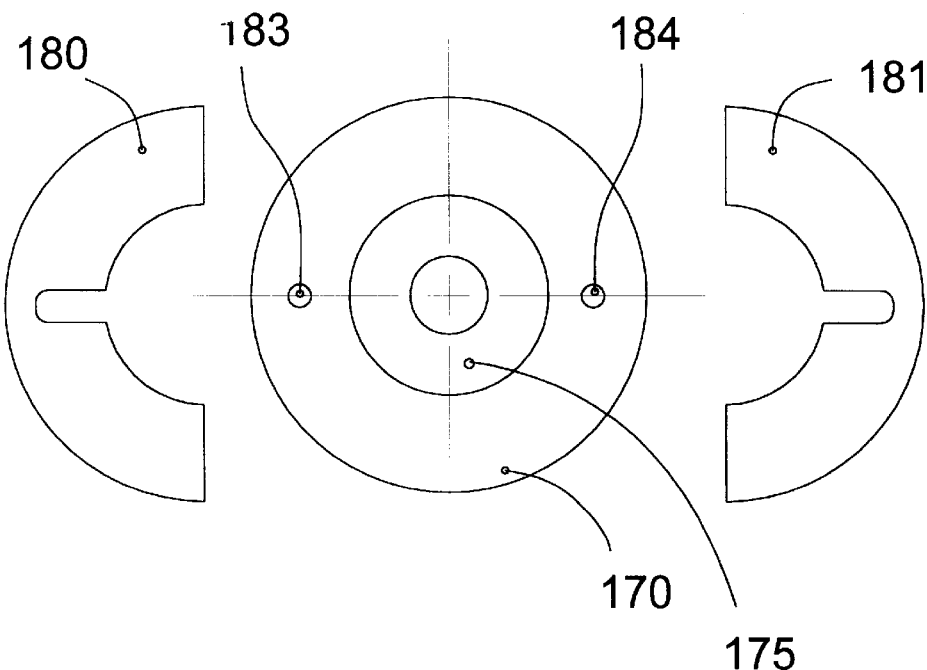
FIG. 6 is a cross-section view of version 1 of a second adapter ring.
Figure 6:
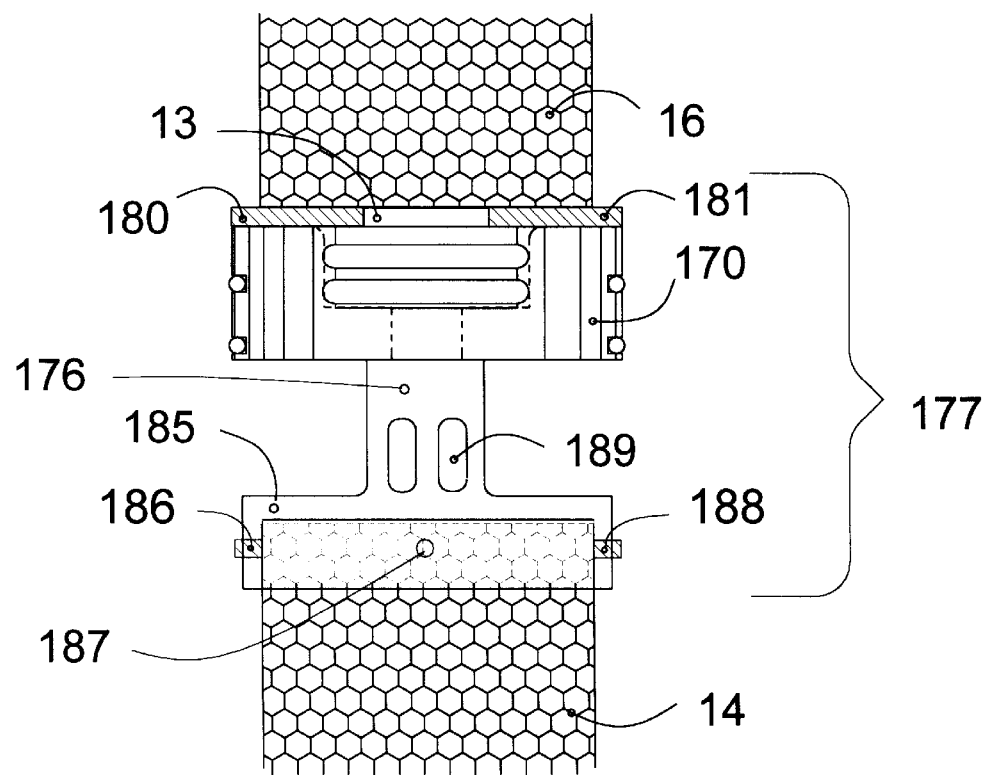
Figure 7:
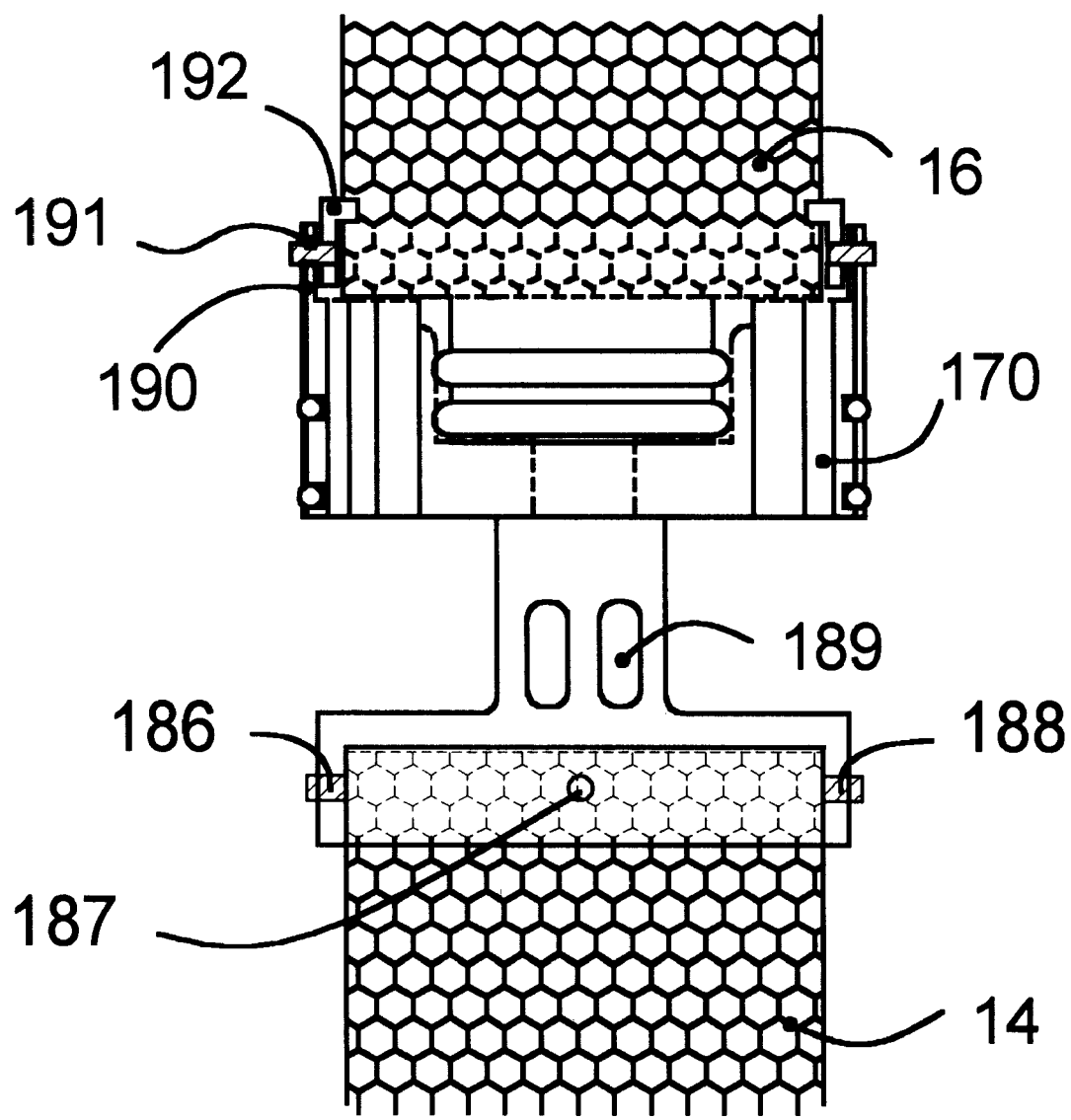
FIG. 7 is a cross-section view of version 2 of a second adapter ring.
Figure 8:
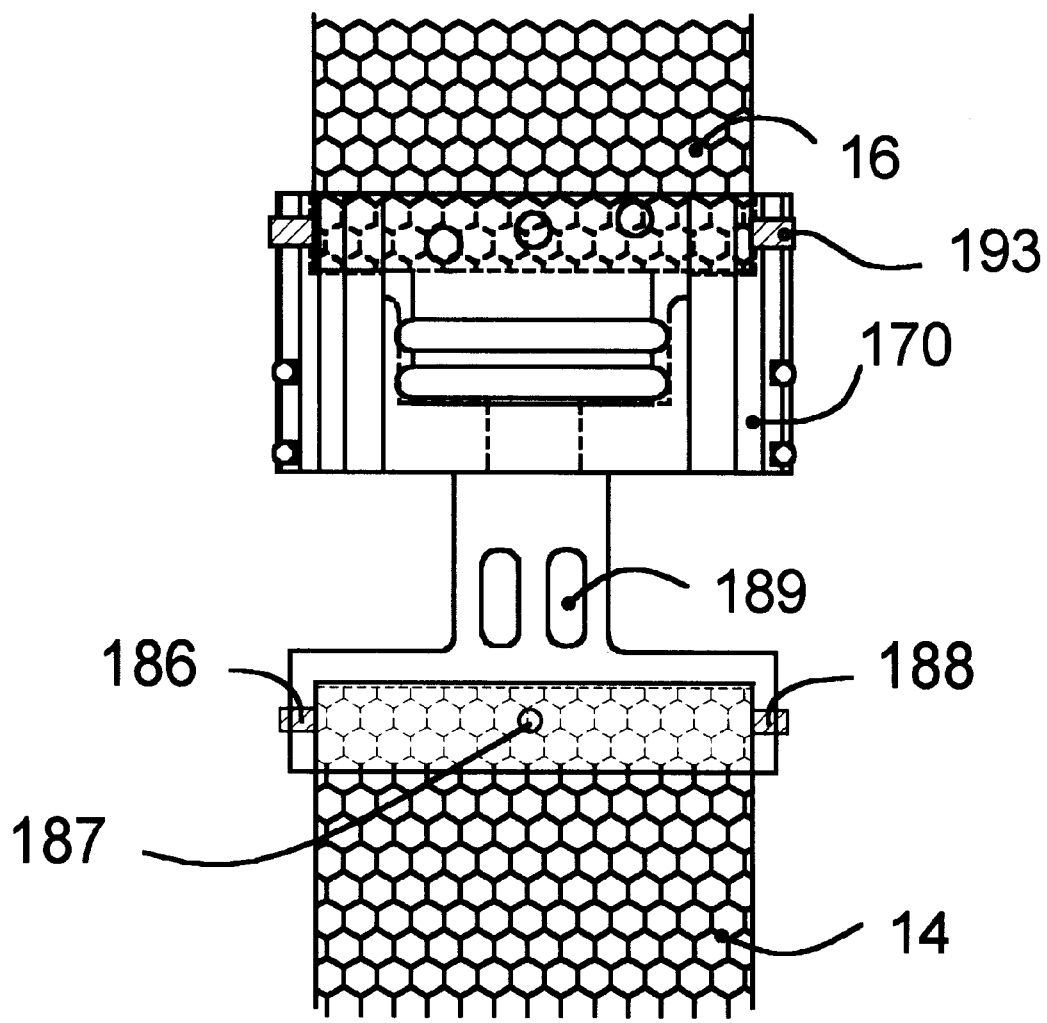
FIG. 8 is a cross-section view of version 3 of a second adapter ring.
Figure 9:
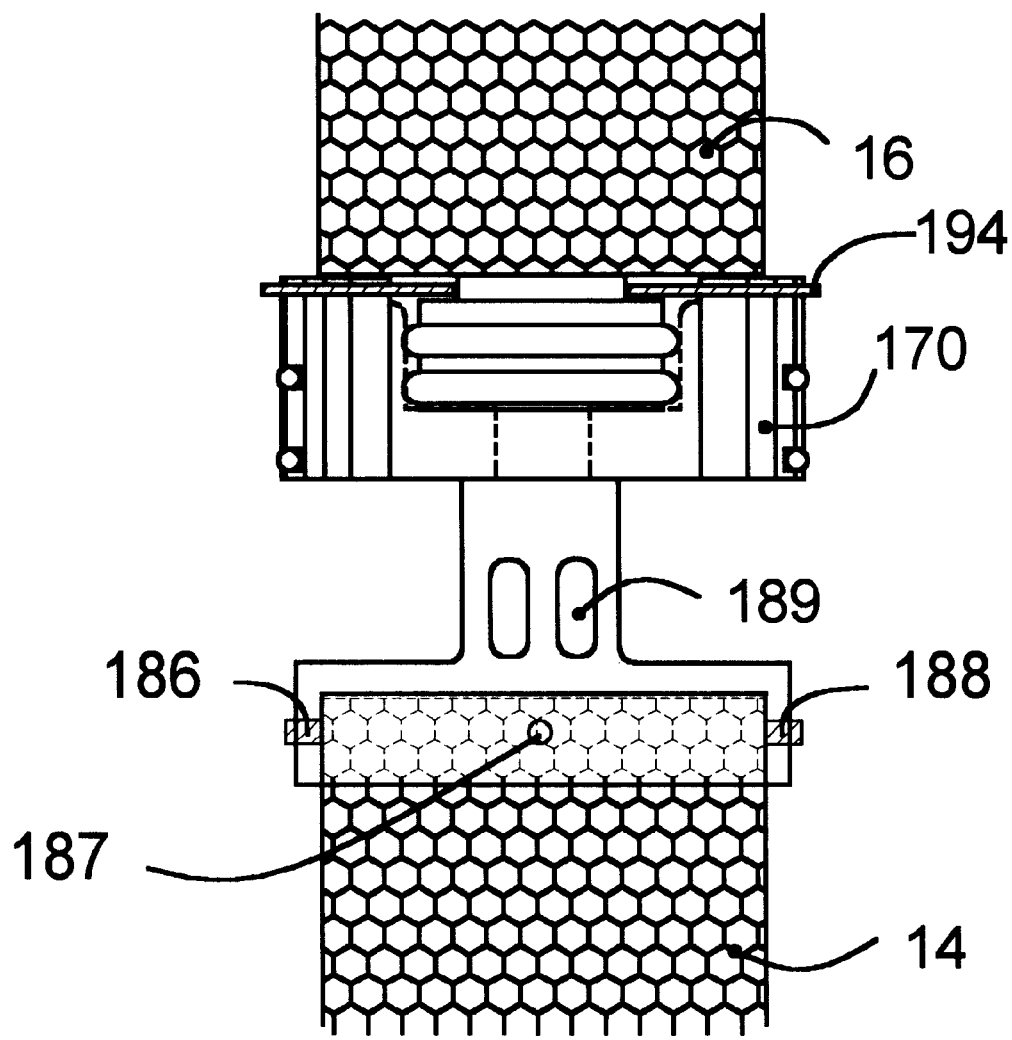
FIG. 9 is a cross-section view of version 4 of a second adapter ring.
Figure 10:
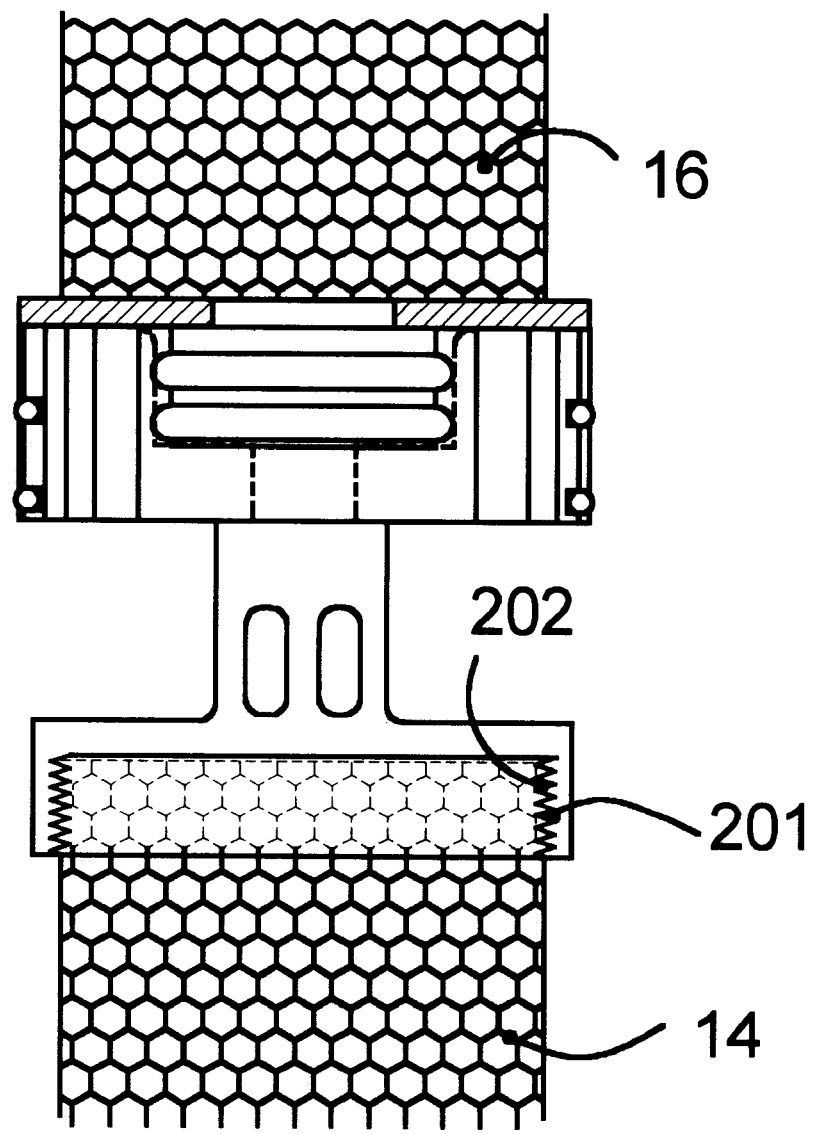
FIG. 10 is a cross-section view of version 5 of a second adapter ring.
Figure 11:
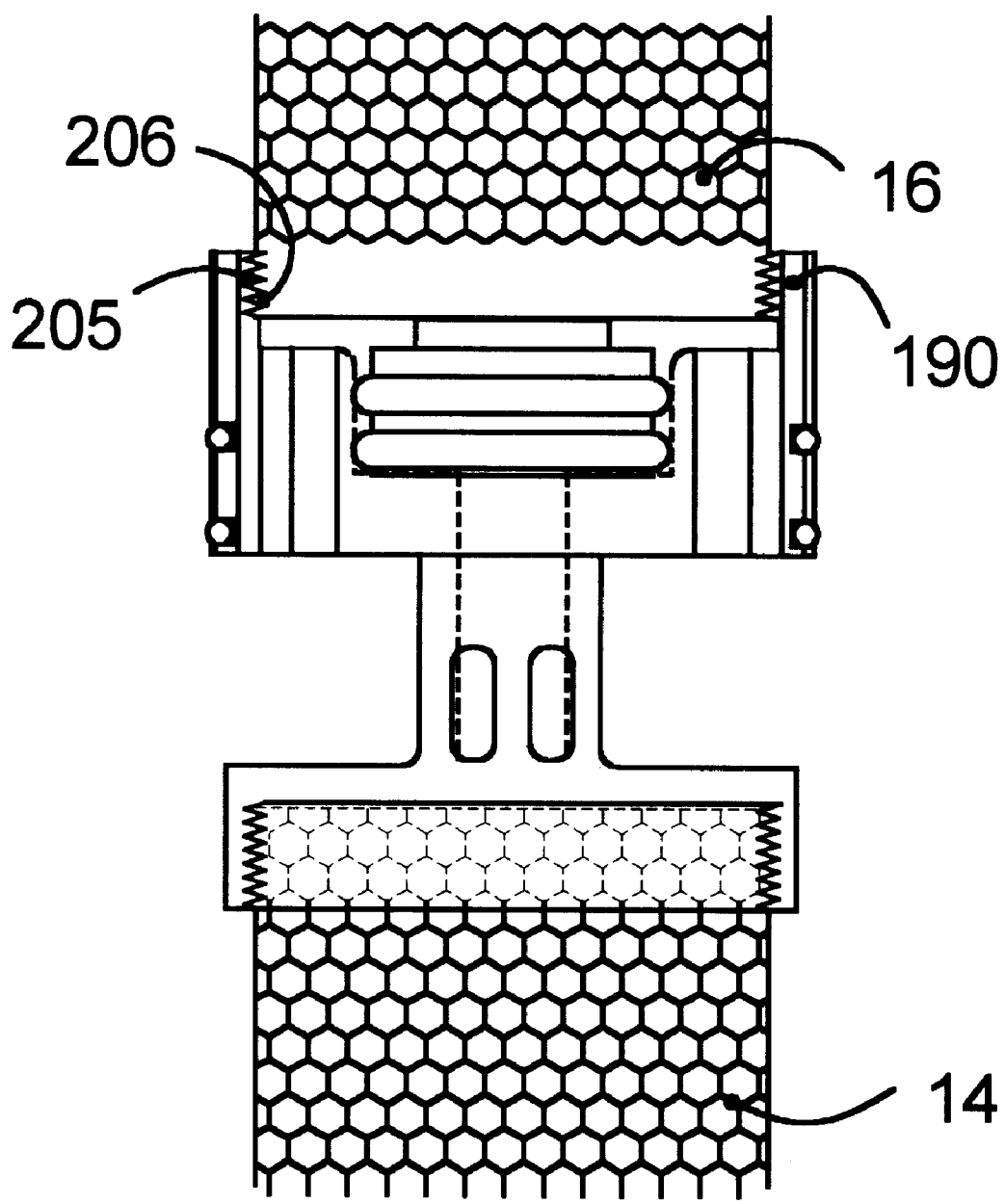
FIG. 11 is a cross-section view of version 6 of a second adapter ring.
Figure 12:
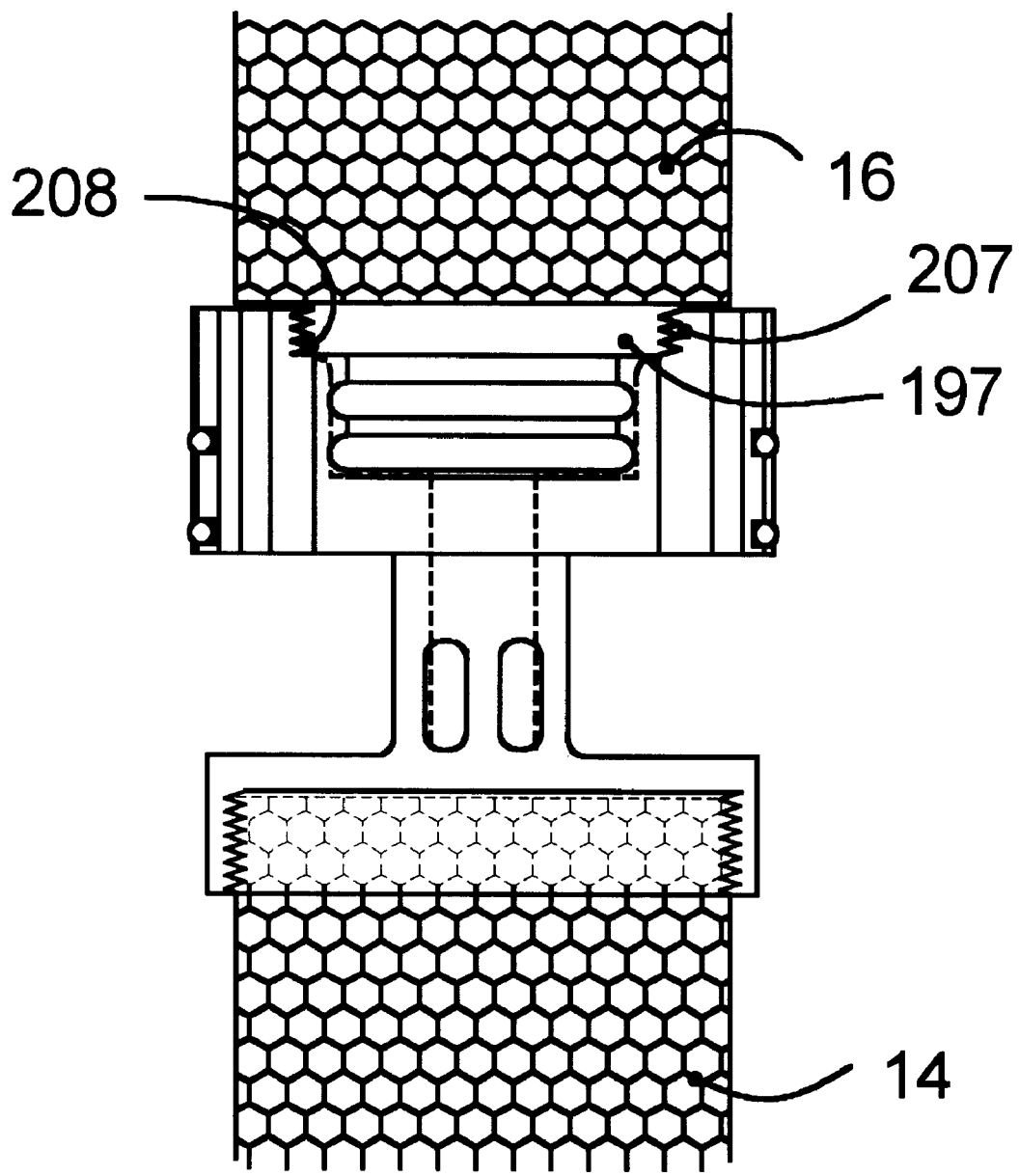
FIG. 12 is a cross-section view of version 7 of a second adapter ring.
Figure 13:
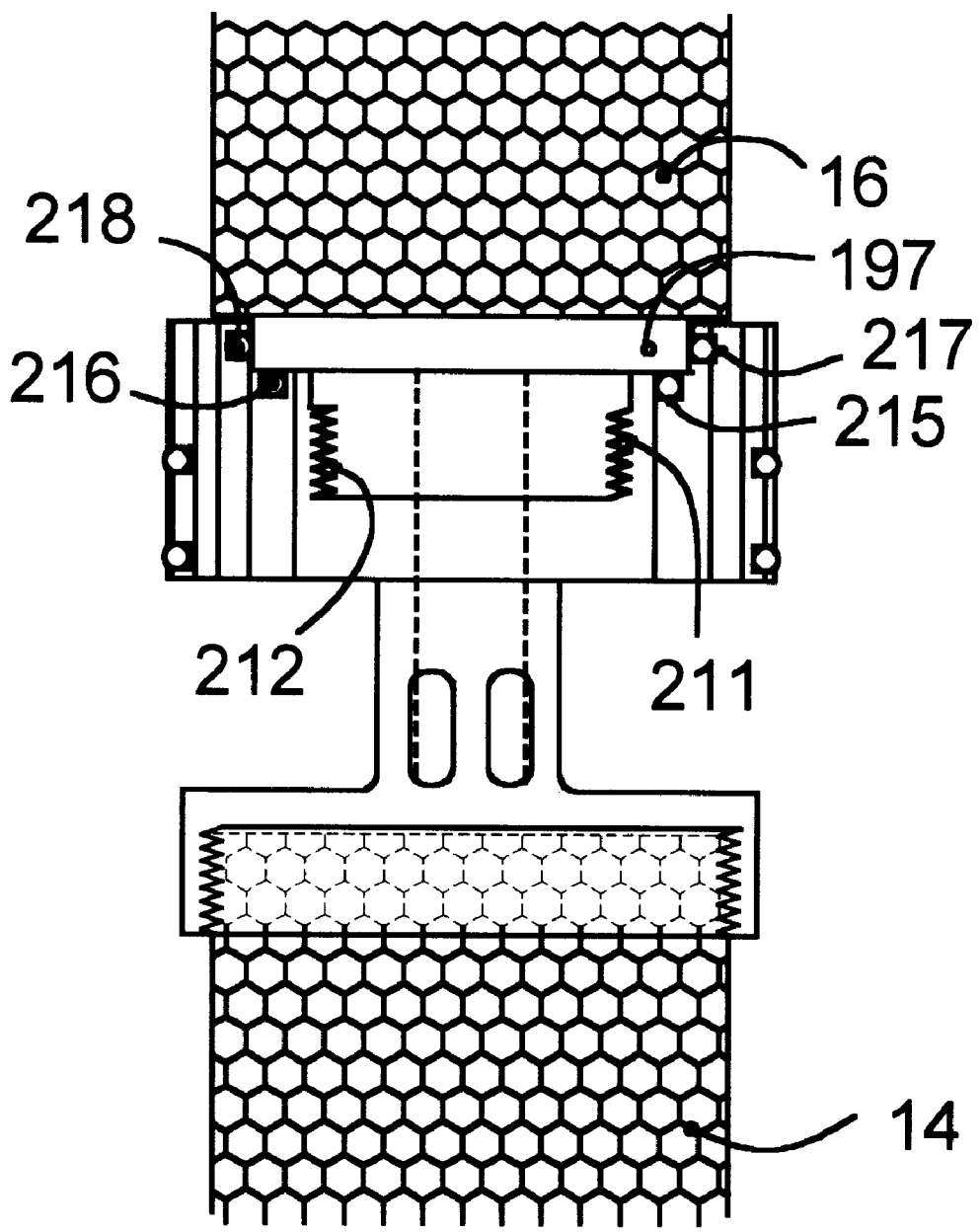
FIG. 13 is a cross-section view of version 8 of a second adapter ring.
Figure 14:
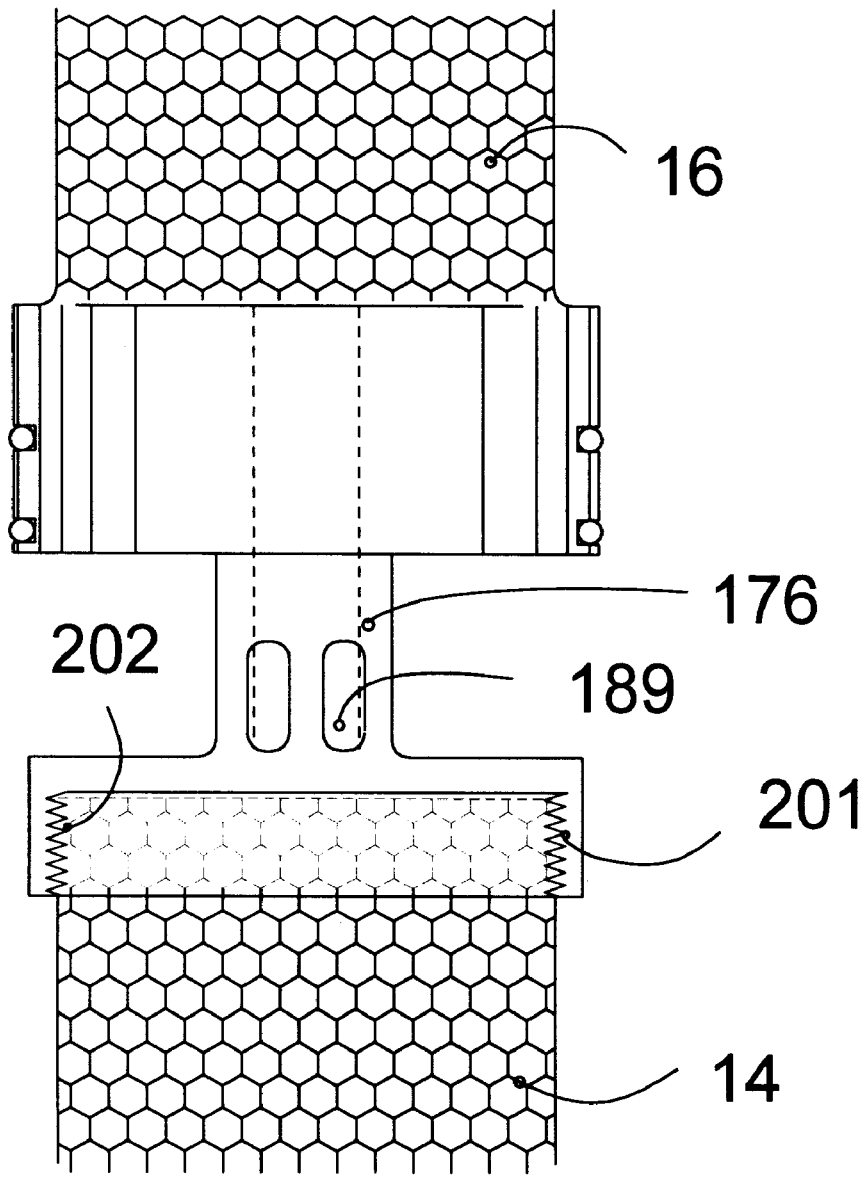
FIG. 14 is a cross-section view of version 9 of a second adapter ring.
Figure 15:
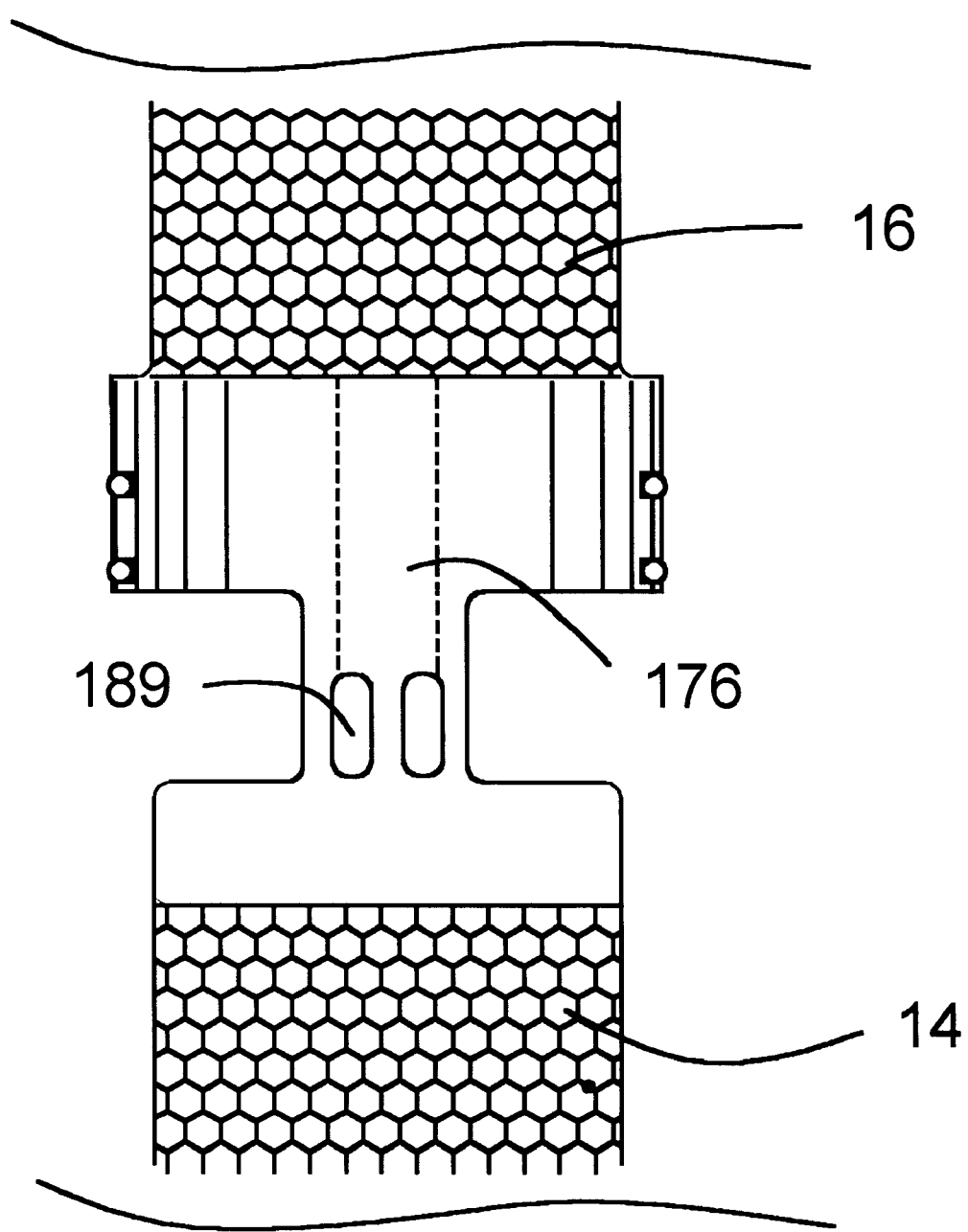
FIG. 15 is a cross-section view of version 10 of a second adapter ring.
Figure 16:
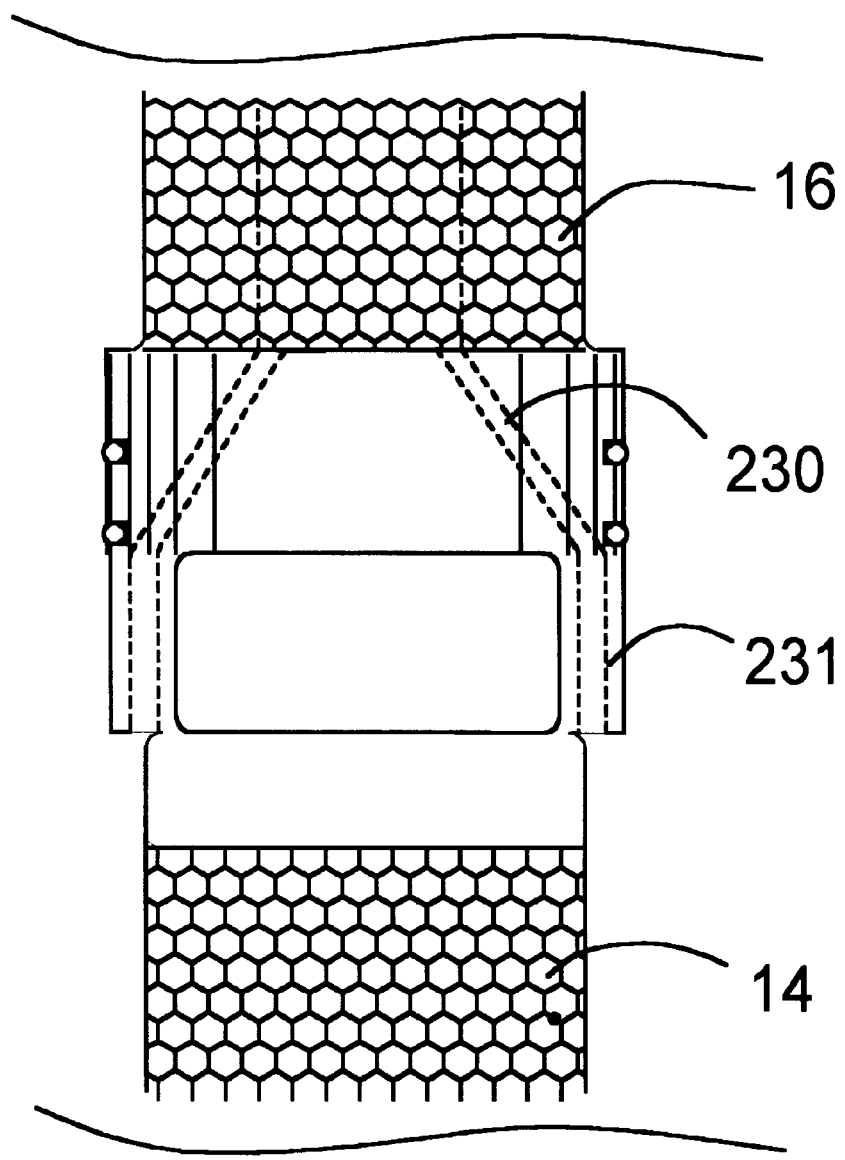
FIG. 16 is a cross-section view of version 11 of a second adapter ring.
Figure 17:
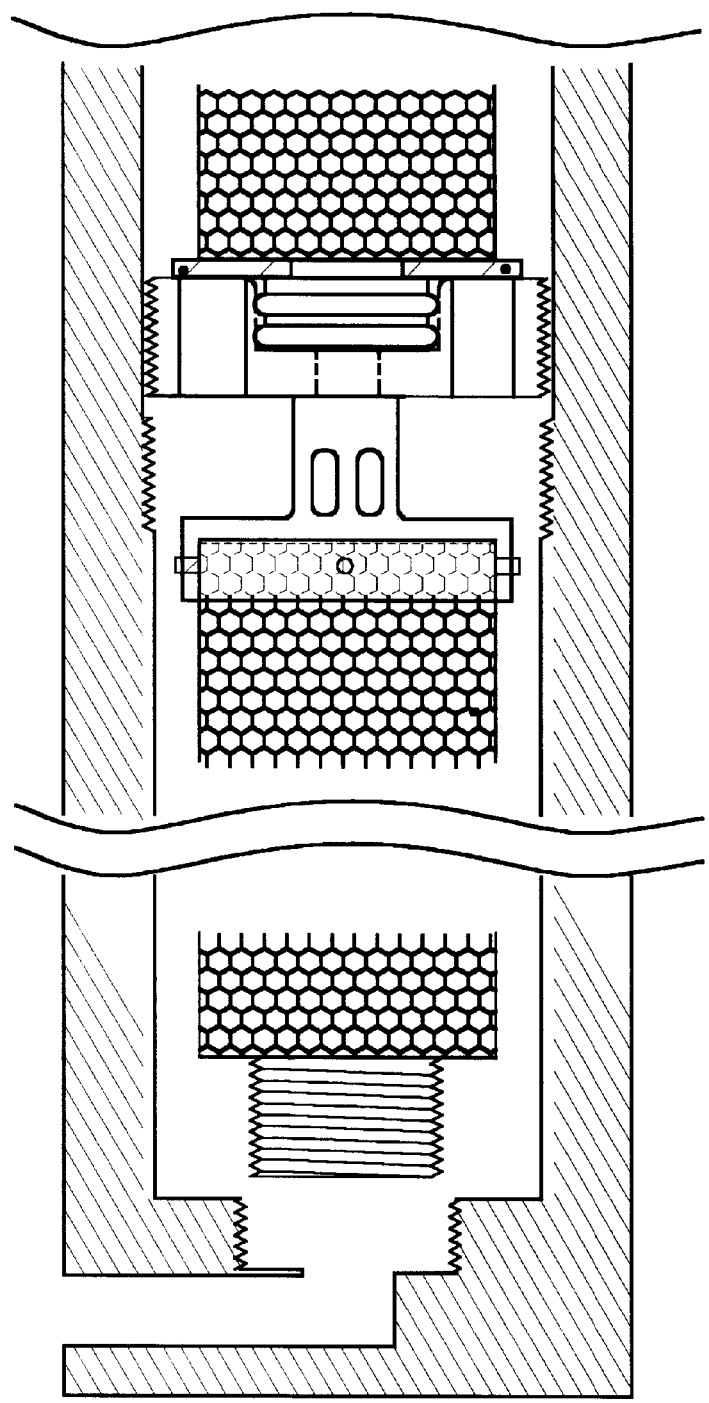
FIG. 17 is a view of an adapter ring screwed into the housing.

FIG. 6 illustrates an adapter ring assembly 177 using a modification of adapter ring 170 (refer to FIG. 5) which facilitates connecting several cartridges within cavity 51. After the insertion of nose 17 of cartridge 16 into recess 175 of adapter ring 170, slotted semicircular plates 180, 181 are attached to adapter ring 170 by pushing their respective slots into set screws 183, 184 on the upper surface of adapter ring 170. These screws are then tightened onto adapter ring 170 after the semicircular center cutouts of plates 180,181 are fitted into the neck 13 of cartridge 16. Adapter ring 170 carries at its lower end concentric tube 176 with lateral openings 189 to which a downwardly open cap 185 is attached. Cap 185 fits tightly over the top of cartridge 14 and is fastened to it by set screws 186, 187 and 188 which are evenly spaced around its circumference gripping the closed top of cartridge 14 and centering it within cavity 51 without the need for a spacer ring 82. Tube 176 and its openings 189 redirect the liquid flow from the inside of cartridge 16 to the outside of cartridge 14. Thus a used cartridge assembly 14, 16 can be pulled out of the upper end of extension housing 50 with or without adapter ring 40 in one stroke and a new cartridge assembly 14, 16 can be inserted in short order to minimize the down time required to replace cartridges during filter operations. A second version of adapter assembly 177, as seen in FIG. 7, has a larger radius flange 190 extending upwards to cover the lower end of the body of cartridge 16, carrying a plurality of threaded holes 191 around its circumference for screwing on clamps 192 (or for set screws 193 in a third version, see FIG. 8) which reach into the support structure of the upper cartridge 16. As depicted in FIG. 9, in a version 4 a plurality of threaded holes are provided around the circumference of the adapter ring for set screws 194 to reach into the neck 13 of cartridge 16. A fifth version (see FIG. 10) is similar to that of FIG. 6 using semicircular plates 180, 181 for fastening adapter ring 170 to the neck 13 of cartridge 16, with the cap 185 carrying an inner thread 201 to engage an outer thread 202 at the top end of cartridge 14. This feature of screwing cap 185 to the top of cartridge 14 also applies to the following versions 6 through 9 (FIGS. 11–14). A version 6, as depicted in FIG. 11, employs an inner thread 205 within the large radius flange 190 to engage an outer thread 206 at the lower end of the body of cartridge 16. In version 7, illustrated in FIG. 12, recess 175 is equipped with inner thread 207 to engage outer thread 208 on nose flange 197, located between nose O-rings 18, 19 and the body of cartridge 16. A smaller, deeper recess receives the nose 17 carrying O-rings 18, 19. In version 8, as seen in FIG. 13, recess 175 carries innner thread 211 to engage outer thread 212 on the cylindrical portion of nose 17. Recess 175 also carries groove 215 for O-ring 216, sealing axially against nose flange 197 and groove 217 for O-ring 218 sealing radially against nose flange 197. A ninth version (see FIG. 14) includes a direct welded or molded connection of the bottom part of cartridge 16 without nose 17 to adapter ring 170, with tube 176 carrying lateral openings 189, and with the inner thread 201 of cap 185 engaging outer thread 202 on the top portion of the body of lower cartridge 14. More economical is an tenth version, as seen in FIG. 15, which comprises a one-piece molded implementation of the ninth version with a direct molded attachment of cartridge 16, without nose 17,to adapter ring 170 with tube 176 carrying openings 189, which in turn is molded to the top of cartridge 14 without cap 185. FIG. 16 shows a version 11 of adapter ring 170 for a one-piece mold including cartridges 16 and 14. Cartridge 16 without nose 17 is connected to adapter ring 170, without recess 175, which is directly molded to the top of cartridge 14. Slanted radial channels 230, with vertical tubes 231 ending between the perimeter of cartridge 14 and the wall of cavity 51 of housing 50, direct the liquid flow from the inner cavity of cartridge 16 to the circumference of cartridge 14. An air pocket for dampening pressure variations is generated between the end of tubes 178 and the bottom of adapter ring 170. The tasks of adapter ring 170 are centering the bottom of the upper cartridge and the top of the lower cartridge and redirecting the liquid flow from the center of the upper cartridge to the circumference of the lower cartridge while sealing against the pressure drop across the upper cartridge 16. As depicted in FIG. 17 the cartridge assembly 16, 14 and adapter assembly 177 may also include a thread 241 on the outer circumference of adapter ring 170 engaging a thread 242 above a recess within cavity 51 and or a thread 251 on nose 15 of cartridge 14 engaging a thread 252 in recess 33 of bottom housing 20. In general, the liquid to be filtered enters housing 50 via inlet 60, then enters cartridge 16 along its outer cylindrical surface in an inwardly radial direction towards its cavity which ends in nose 17 within adapter ring 170. Its openings 189 direct the liquid to the ouside of lower cartridge 14 through which the liquid flows in an inwardly radial direction toward nose 15 within adapter ring 40 and exits in a downward direction via opening 34 towards outlet 36. The combination of an air pocket at the top of housing assembly 10, mostly within top housing 120, and at least one air pocket between filter cartridges 14, 16 below adapter ring 170 around tube 176 above openings 189 comprise at least two air pockets in series within the cavity of housing assembly 10 for a multi-dampening effect on pressure variations such that the liquid flowing out of outlet 36 is nearly free of pressure variations caused by a pump feeding the housing assembly.

Figure 19:
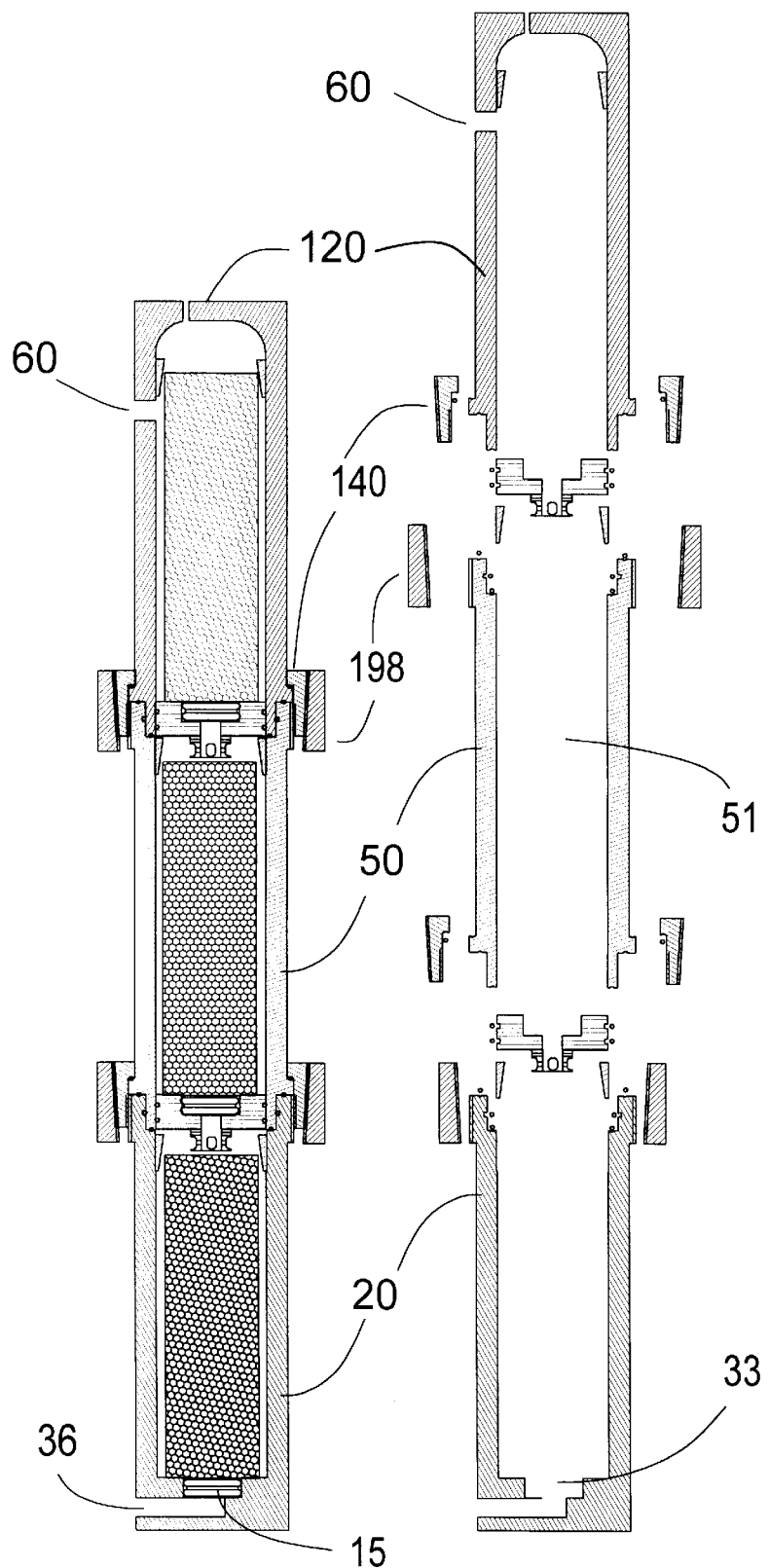
FIG. 19 is a cross-section overview of version B of a housing assembly.
Figure 20:
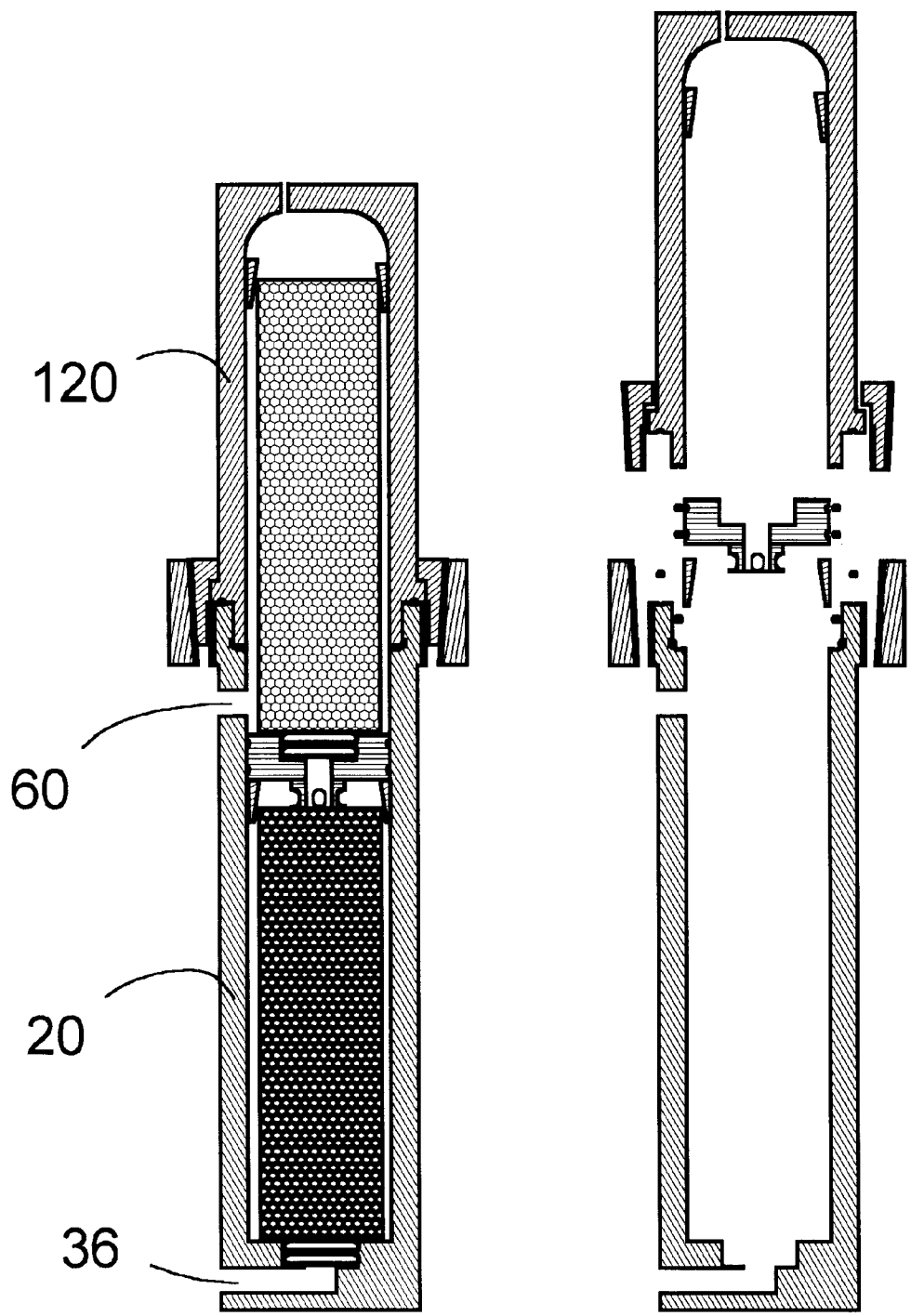
FIG. 20 is a cross-section overview of version C of a housing assembly.

FIG. 19 shows version B of the preferred embodiment. Bottom housing 20 and top housing 120 are cup-instead of cap-shaped for covering one cartridge each. Bottom housing 20 does not include recess 26 and does not need adapter ring 40. Instead, the shape of recess 45 including opening 46 of adapter ring 40 is directly incorporated into bottom housing 20 for receiving nose 15 of cartridge 14. Extension housing 50 is subdivided into identical version of housings 50, covering one cartridge each. M-2 extension housings are needed for an M cartridge filter housing assembly with two cartridges accomodated by top housing 120 and bottom housing 20. Inlet 60 is included in top housing 120. All other dimensions of components of version B of housing assembly 10 are essentially identical to those of version A. FIG. 20 shows a two-cartridge version C of the embodiment B. Bottom housing 20 and top housing 120 are cup-shaped, similar to version B. No extension housing 50 is present. Bottom housing 20 is elongated beyond the shape of version B of bottom housing 20 to accommodate inlet 60 just above adapter ring 170 and spacer ring 82. Top housing 120 version C is correspondingly shorter. For a removal or exchange of cartridges inlet 60 and outlet 36 pipe assembly connections, both being attached to bottom housing 20, can be left intact and only top housing 120 has to be removed. All other dimensions of the components of housing assembly 10 version C are essentially identical to those of version A. Adapter ring 170 and spacer ring 82 are needed within housing 20C for centering cartridges 14 and 16 and for sealing against the pressure drop across cartridge 16, and spacer ring 114 is needed for centering the top of cartridge 16 within the cavity of housing 120 version C. Referring to FIG. 4, vent tube 130 has a needle valve 131 with its adjustment screw 132 and empties into an open air liquid reservoir (not shown) at the intake of a pump feeding the liquid into housing assembly 10. The lower end of vent tube 130 reaches through the space within top housing 20 down to spacer ring 114, thus defining the lowest level of the liquid to be above the top of cartridge 16. In the first instance of operating the filter housing assembly 10 air is pushed out through vent tube 130 until the rising liquid level reaches the orifice of vent tube 130. This action traps an air pocket in the cavity of housing 120 above spacer ring 114 and within the top housing which dampens pressure variations of the liquid. When the liquid level in housing 120 rises higher, the compressed air in the cavity of housing assembly 10 opposes the action, thus stabilizing the liquid level inspite of variations in the inlet pressure due to pump action. The liquid level is thus defined at the top of the upper filter cartridge 16 which preserves the utilization of the total filter area. Without this feature the liquid level will fluctuate much more depending on the pressure variation created by a pump, which may decrease the utilized filter area of the upper cartridge. The liquid path cross-section of vent tube 130 is very small in comparison to that of filter cartridge 16 causing only an insignificant amount of liquid to be forced out by the over-pressure in housing 120 through vent tube 130, which is screwed into thread 133 in the dome of housing 120. By turning screw 132 of needle valve 131 the valve orifice cross-section is changed for the out-flowing liquid, whereby the air pocket pressure is adjusted depending on the number of cartridges, each with its own pressure drop.

For assembly of version A, first bottom housing 20 is prepared. O-ring 25 is placed into groove 24, O-ring 28 is placed into groove 27 and O-ring 32 is placed into groove 31. Adapter ring 40 carrying O-rings 42,44 in grooves 41 and 43, respectively, is now inserted into housing 20. Thereafter stub 56 of housing 50 is inserted into recess 26 of bottom housing 20 and by turning nut ring 70, its inner thread 72 is engaging outer thread 22 of housing 20 and recess surface 73 pushes on annular surface 53 via O-ring 162, thus joining housings 20 and 50. Thus O-ring 28 is pressed against the cylindrical surface 57 of stub 56, O-ring 32 is pressed into grooves 31 and 59, and O-ring 25 is pressed into grooves 24 and 55, O-ring 42 is pressed against the cylindrical portion of recess 33 and O-ring 44 is pressed against cavity 51 of housing 50. This provides a quadruple seal by O-rings 44, 32, 28, 25 between the lower end of cavity 51 and the outside atmo-sphere and another quadruple seal by O-rings 42, 32, 28, 25 between the nose 15 of cartridge 14 and the outside atmosphere. By turning tension ring 78, its inner thread 79 engages outer thread 74 of nut ring 70 to provide a tight and reliable fit between threads 22 and 72 and to prevent the interface between housings 20 and 50 from disengaging due to temperature cycling. The cartridge assembly begins with the nose 17 of cartridge 16 being inserted into the upper end of adapter ring 170, plates 180 and 181 (see FIG. 6) are placed around the neck of nose 17 and fastened using screws 183 and 184 and the top of cartridge 14 is inserted into its cap 185 and screws 186, 187 and 188 are tightend. Thereafter spacer ring 114 is placed at the top end of cartridge 16. Then this assembly is inserted into the top end of cavity 51 of housing 50. Since the inside radius of cavity 51 is slightly larger than the radius of the adapter ring 170 except around its end position, cartridge insertion and and removal is made easier. By pushing the cartridge assembly deep into cavity 51 the nose 15 of cartridge 14 is inserted into recess 45 of adapter ring 40. Split ring 85 and tension ring 88 is placed midway between top and bottom end of housing 50 (roughly across adapter ring 170) and tightened. The assembly of the interface between housings 50 and 120 proceeds analogously. Spacer ring 114 on top of cartridge 16 is now approximately level with surface 100 in recess 96. O-ring 95 is placed into groove 94, O-ring 98 is placed into groove 97 and O-ring 103 is placed into groove 101. Thereafter stub 126 of housing 120 is inserted into recess 96 of housing 50 and by turning nut ring 140, its inner thread 142 is engaging outer thread 92 of housing 50 and recess surface 143 pushes onto annular surface 123 via O-ring 166, thus joining housings 50 and 120. Thus O-ring 98 is pressed against the cylindrical surface 127 of stub 126, O-ring 103 is pressed into grooves 101 and 129, and O-ring 95 is pressed into grooves 94 and 125. Finally vent tube 130 is inserted into top housing 120 deep enough for its orifice to reach between the apeces of spacer ring 114 and fastened by thread 133. Although the present invention has been described in terms of the presently preferred embodiment, it is to be understood that such disclosure is not to be construed as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A housing assembly (10) for the filtration of a liquid, for temporarily holding at least a lower replaceable filter cartridge (14) and an upper replaceable filter cartridge (16), each with a closed top and an open end nose (15,17), the housing assembly comprising:
    a) a cap-shaped bottom housing (20) with a flat bottom surface (37) having a lip (21) surrounding a first recess (26), with first fastening means (22) and first sealing means (25, 24, 28, 27, 32, 31), surrounding a second recess (33), smaller than the first recess, and having an outlet (34, 36);
    b) an tube-shaped extension housing (50) having a cavity (51), for receiving at least a lower cartridge (14) and an upper cartridge (16), having at its lower opening second fastening means (51, 52, 53, 54, 56) and second sealing means (55, 59, 161, 162) engaging the first fastening and the first sealing means of the bottom housing, respectively, for providing a fastening and sealing first interface to the bottom housing, the extension housing having at its upper opening a lip (91), surrounding a third recess (96) with third fastening means (92) and third sealing means (95, 94, 98, 97, 103, 101), and having an inlet (60);
    c) a cap-shaped top housing (120) having fourth fastening means (122, 126) and fourth sealing means (125, 129, 165, 166) engaging the third fastening and sealing means of the extension housing, respectively, for providing a fastening and sealing second interface to the extension housing to form a closed sealed cavity of the housing assembly (10);
    d) first receiving means (40) for concentrically and sealingly receiving the nose (15) of the lower cartridge (14) within the housing assembly (10), and having fifth sealing means (41, 42, 43, 44) against the pressure drop across the lower cartridge (14);
    e) second receiving means (170) for concentrically and sealingly receiving the nose (17) of the upper cartridge

(16) within the housing assembly (10), and having sixth sealing means (171, 172, 173, 174) against the pressure drop across the upper cartridge (16), the receiving means being adapted for redirecting the liquid flow from the nose of the upper cartridge to the outside surface of the lower cartridge;

f) first centering means (82) for concentrically receiving the top end of the lower cartridge (14) within the housing assembly (10);

g) second centering means (114) for concentrically receiving the top end of the upper cartridge (16) within the housing assembly (10); wherein the liquid to be filtered enters the inlet (60) in the extension housing (50), flows radially through the cylindrical portion of upper cartridge (16) and via its nose (17) through the second receiving means (170) and the first centering means (82) where it is redirected to flow radially through the cylindrical portion of the lower cartridge (14) and via its nose (15) through the means (40) for concentrically and sealingly receiving the nose (15) of the lower cartridge (14), to the outlet (34, 36) of the bottom housing (20).

2. The housing assembly (10) of claim 1, wherein:

the top housing (120) also has a vent tube (130) extending through the space within the top housing down to the extension housing (50) for setting a lowest liquid level above the top of the upper cartridge (16) and for providing a compressible air pocket in the housing assembly for dampening pressure variations of the liquid due to pump action.

3. The housing assembly of claim 1, wherein:

a seventh fastening means (85, 88, 89) across from the second receiving means (170) for concentrically and sealingly receiving the nose (17) of the upper cartridge (16) provides for a tightening of the outside of the extension housing (50) for the prevention of fluid leaks along the outside cylindrical surface of said second receiving means (170).

4. The housing assembly of claim 1, wherein:

the first interface and the second interface are substantially identical.

5. A housing assembly (10) for the filtration of a liquid, for temporarily holding at least a replaceable lower filter cartridge (14) and a replaceable upper filter cartridge (16), each with a closed top and an open end bottom nose (15, 17), the nose carrying two O-rings (18, 19), the housing assembly comprising:

a) a cap-shaped bottom housing (20), and with a flat bottom outer surface (37) and with a cylindrical outer surface having an outer thread (22) on an upper portion, the bottom housing also having at its top an upwardly open first recess (26) with a lip (21), the lip having an annular surface (23) with a first groove (24) for holding a first O-ring (25), the recess (26) also having on its inner cylindrical surface a second groove (27) for holding a second O-ring (28) and also having an annular bottom surface (30), with a third groove (31) for holding a third O-ring (32), the bottom surface surrounding a second recess (33) with an opening (34) and an outlet (36) for the liquid;

b) a tube-shaped extension housing (50) with a cavity (51) for receiving the lower cartridge (14) and the upper cartridge (16), with an inlet (60) for the liquid, the extension housing at its lower opening having a concentric first stub (56), with an annular surface (58) carrying a fourth groove (59) for engaging the third O-ring (32), and also having a first flange (52) having an annular upper surface (53) carrying a fifth groove (161) for a fourth O-ring (162), and also having an annular lower surface (54) carrying a sixth groove (55) for engaging the first O-ring (25), the extension housing at its upper opening having an upper lip (91), carrying a thread (92) on its cylindrical outer surface, the lip having an annular surface (93) with a seventh groove (94) for a fifth O-ring (95), surrounding a third recess (96) with an eighth groove (97) on its inner surface for an sixth O-ring (98), the recess having an annular bottom surface (100) with an ninth groove (101) for a seventh O-ring (103);

c) a cap-shaped top housing (120) having around its downwardly open cavity a concentric second stub (126), with an outer cylindrical surface (127) and with an annular surface (128), carrying a tenth groove (129) for engaging the seventh O-ring (103), the top housing (120) also having a flange (122), with an annular lower surface (124) carrying an eleventh groove (125) for engaging the fifth O-ring (95) and with an annular upper surface (123) carrying an twelfth groove (165) for an eighth O-ring (166);

d) a first adapter ring (40) having a cylindrical outer surface carrying at least one groove (43, 41) for at least one O-ring (44, 42) and having a recess (45) with an outlet (46), for concentrically receiving the nose (15) of the lower cartridge (14) with its O-rings (18, 19) and sealing the recess against the pressure drop across the lower cartridge;

e) a second adapter ring (170) having a cylindrical outer surface carrying at least one groove (171, 173) for at least one O-ring (172, 174) for sealing against the housing cavity (51) against the pressure drop across the upper cartridge (16) and having a recess (175) for concentrically receiving the nose (17) with its O-rings (18, 19) of the upper cartridge (16), for sealing against the pressure drop across the cartridge (16), with a concentric downward tube (176) communicating with the recess (175) and having lateral openings (189) for liquid flow at its lower end, for redirecting the flow of a liquid from the nose (17) of the upper cartridge (16) to the circumference of the lower cartridge (14) and for providing an air pocket between the upper end of the tube openings (189) and the lower surface of the adapter ring (170) for dampening liquid pressure variations;

f) a first nut ring (70) having an annular lower recess surface (73) with a thirteenth groove (163) for engaging the fourth O-ring (162), a tapered outside thread (74) and a cylindrical inner thread (72) for engaging the outside thread (22) of the bottom housing (20) when the first stub (56) of the extension housing is inserted into the first recess (26) of the bottom housing, thus creating radial seals by the at least one O-ring (42, 44) of the first adapter ring (40) sealing against an inner surface of the first stub (56), and by the second O-ring (28) sealing against an outer surface (57) of the stub (56), and creating axial seals by the first and third O-rings (25, 32), thus providing a sealing and fastening first interface between the bottom and extension housings (20, 50);

g) a second nut ring (140) having an annular recess surface (143) carrying a fourteenth groove (167) for engaging the eighth O-ring (166), a tapered outside thread (144) and a cylindrical inner thread (142) and for engaging the outer thread (92) of extension housing (50) when the second stub (126) of the top housing is inserted into the third recess (96) of the extension housing, thus creating a radial seal by the sixth O-ring (98) sealing against the cylindrical surface (127) of the second stub (126), and creating axial seals by the fifth and seventh O-rings (95, 103), thus providing a sealing and fastening second interface between extension and top housings (50, 120) such that the bottom housing via the first interface and the top housing via the second interface form a closed sealed cavity with the extension housing, and such that the liquid to be filtered enters the inlet (60) in the extension housing (50), flows radially through the upper cartridge (16) and out its nose (17) into the second adapter ring (170), through the tube (176) and its openings (189) to flow to the outside surface and radially through the cylindrical portion of the lower cartridge (14) and through its nose (15) to the outlet (34, 36) of the bottom housing (20).

6. The housing assembly of claim 5, wherein:

the second recess (33) in the bottom housing receives the first adapter ring (40) having a recess (45) with an opening (46) for concentrically and sealingly receiving the nose (15) of the lower cartridge (14), and on its outside cylindrical surface having a lower O-ring (42), for sealing against the second recess (33) when inserted into the bottom housing (20), and having an upper O-ring (44), for sealing against the inner surface of the first stub (56) of the extension housing (50), the adapter ring sealing against the pressure drop across the lower cartridge (14).

7. The housing assembly of claim 6, wherein:

a first spacer ring (82) with channels for liquid flow is disposed for concentrically receiving the upper end of the lower cartridge (14) within the cavity (51) of the extension housing (50) and for directing the flow of the liquid from the nose (17) of the upper cartridge (16) and the openings (189) of the second adapter ring (170) to the outer cylindrical surface of the lower cartridge (14) and wherein a second spacer ring (114) with channels for liquid flow is disposed for concentrically receiving the upper end of the upper cartridge (16) within the cavity (51) of the extension housing (50).

8. The housing assembly of claim 6, wherein:

a split ring (85) with an outer tapered thread (86) is disposed around the extension housing (50) opposite the second adapter ring (170) and a third tension ring (88) with an inner tapered thread (89) is disposed for engaging the outer thread (86) of the split ring (85) in order to apply radial pressure to prevent bulging of the extension housing (50) and a leak around the second adapter ring (170).

9. The housing assembly of claim 6, wherein:

the cavity (51) has a radius slightly larger than the radius of the second adapter ring (170) except for a decreased radius zone (179) opposite the second adapter ring (170) at the juncture of the two cartridges, for easy insertion and removal of the upper and lower cartridges.

10. The housing assembly of claim 9, wherein:

the decreased radius zone (179) within the cavity (51) of extension housing (50) carries a recess (235) for receiving the second adapter ring (170) to provide spacing between the bottom surface of the adapter ring with a level tube (176) and the top of the lower cartridge (14) for liquid flow to its circumference from the tube of the adapter ring.

11. The housing assembly of claim 5, wherein:

a first tension ring (78) with an inside tapered thread (79) is disposed for engaging the outer thread (74) of the first nut ring (70) to press its inner thread (72) against the outer thread (22) of the lip (21) of the bottom housing (20) and wherein a second tension ring (188) with an inner tapered thread (189) is disposed for engaging the outer thread (144) of the second nut ring (140) to press its inner thread (142) against the outer thread (92) at the upper lip (91) of the extension housing (50) for leakproof connections inspite of temperature cycling and for easy maintenance of the first and the second interface, respectively.

12. The housing assembly of claim 5, wherein:

the second adapter ring (170) has a concentric tube (176), level with its bottom surface, the bottom surface carrying downwardly extending axial spacers (233) for providing a space to the top of the lower cartridge (14) to direct liquid flow to its circumference from the tube (176).

13. The housing assembly of claim 5, wherein:

the annular upper surface (53) of the flange (52) of the extension housing (50) has a fifth groove (161) and the recess surface (73) of the first nut ring (70) has a groove (163) for receiving of a fourth O-ring (162) of high elasticity at the first interface for selectively tightening the first nut ring (70) and wherein the annular upper surface (123) of the flange (122) of the top housing (120) has a twelfth groove (165) and the recess surface (143) of the second nut ring (140) has a fourteenth groove (167) for receiving the eighth O-ring (166) at the second interface for selectively tightening the second nut ring (140), thus providing adjustable leakproof connections at the first and the second interface to prevent permanent deformation of the interface O-rings and their grooves at elevated temperature cycling due to excessive tightening of the first nut ring (70) and the second nut ring (140), respectively.

14. The housing assembly of claim 5, wherein:

the second adapter ring (170) having a smaller radius recess (175), for concentrically and sealingly receiving the nose (17) of the upper catridge (16), has a concentric downward tube (176) carrying an opening (189) at its lower end for traspping air around it when housing assembly (10) is filled with liquid, thus providing another air pocket for dampening pressure variations at a juncture between cartridges (14, 16).

15. The housing assembly of claim 119, wherein:

a vent tube (130), fastened by a thread (133) to and through the top housing (120), is extended down to the location of the second spacer ring (114) in the extension housing (60), thus generating an air pocket at the top of the cavity (51) within the housing assembly (10) and defining the lowest liquid level to be above the top of upper cartridge (16) for preserving the maximum filter area inspite of level variations of the liquid due to pressure variations because of the action of a piston pump, and thus dampening the pressure variations, the vent tube having a needle valve (131) with a screw (132) for allowing the adjustment of a valve orifice cross-section of said valve which determines the average pressure in the air pocket as a function of the number of cartridges within the housing assembly (10), each having its own pressure drop.

16. The housing assembly of claim 15, wherein the air pocket at the top of the cavity (51) of the housing assembly (10) and at least one air pocket between cartridges (14, 16) and below the bottom of at least one second adapter ring (170) around its tube (176) above the openings (189) comprise at least two air pockets in series within the cavity of the housing assembly for a multi-dampening effect on the pump pressure variations of the liquid within and the one exiting the housing assembly.

* * * * *